United States Patent [19]

Sakaguchi

[11] Patent Number: 5,263,027
[45] Date of Patent: Nov. 16, 1993

[54] MULTIPLEX TRANSMITTER-RECEIVER SYSTEM

[75] Inventor: Toshikazu Sakaguchi, Osaka, Japan
[73] Assignee: Nakanishi Metal Works Co., Ltd., Osaka, Japan
[21] Appl. No.: 764,679
[22] Filed: Sep. 25, 1991

[30] Foreign Application Priority Data

Oct. 1, 1990 [JP] Japan .................... 2-264544

[51] Int. Cl.$^5$ .............................................. H04J 3/06
[52] U.S. Cl. .................. 370/100.1; 307/260; 363/87
[58] Field of Search ............ 370/100.1; 375/106, 375/107; 363/87, 127; 323/910; 307/269

[56] References Cited

U.S. PATENT DOCUMENTS

| | | | |
|---|---|---|---|
| 4,086,537 | 4/1978 | Asakawa et al. | 370/100.1 |
| 4,156,275 | 5/1979 | Loberg | 363/87 |
| 4,164,015 | 8/1979 | Espelage et al. | 363/87 |
| 4,329,595 | 5/1982 | Watson | 363/87 |
| 4,599,685 | 7/1986 | Hombu et al. | 363/127 |

Primary Examiner—Douglas W. Olms
Assistant Examiner—Min Jung
Attorney, Agent, or Firm—Armstrong, Westerman, Hattori, McLeland & Naughton

[57] ABSTRACT

A multiplex transmitter-receiver system comprising a synchronizing signal generator for producing a plurality of multiplex transmission-receiving synchronizing signals from a three-phase alternating current, and a signal processor for effecting signal processing based on the synchronizing signals for transmitting and/or receiving a plurality of signals through a single signal transmission line. The signal generator comprises a polyphase rectangular wave generator for producing polyphase rectangular waves by shaping the waveform of the three-phase alternating current, and an arithmetic logic unit for producing a plurality of multiplex transmission-receiving synchronizing signals by logic elements based on combinations of the polyphase rectangular waves.

7 Claims, 21 Drawing Sheets

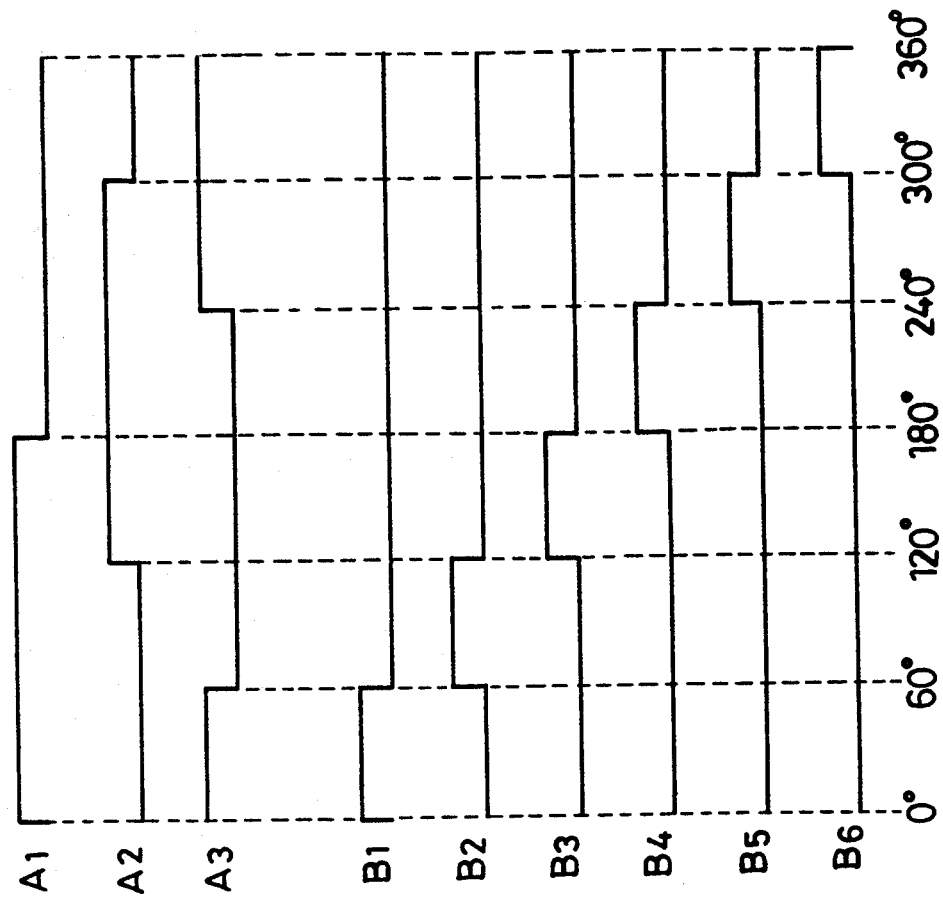
FIG. 5
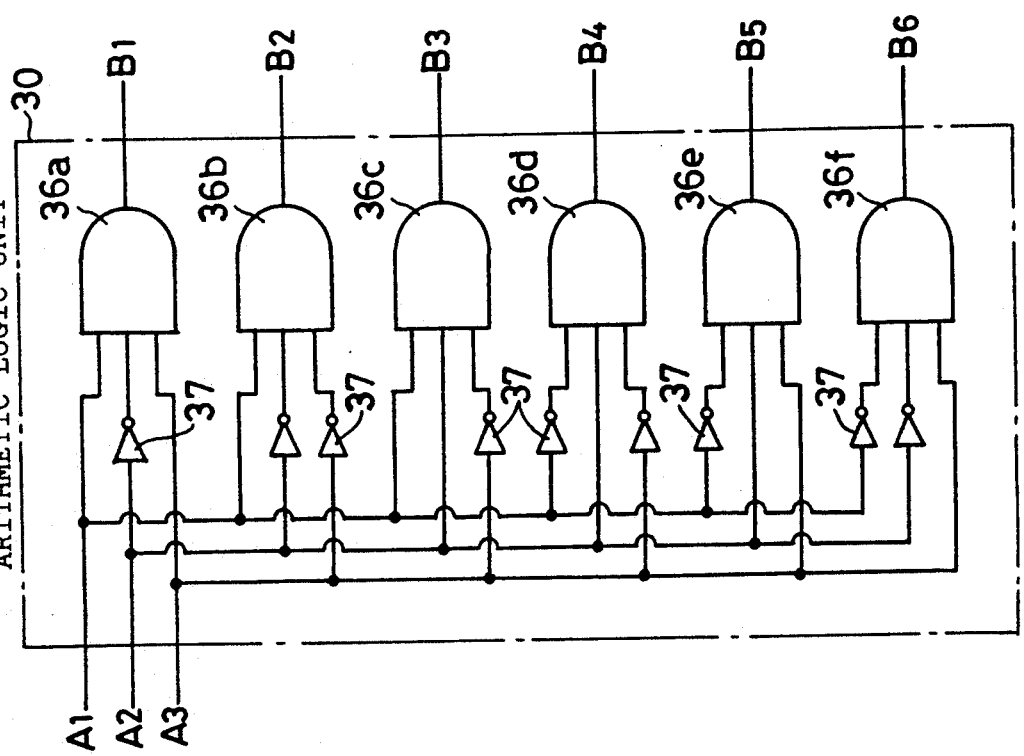
FIG. 4 ARITHMETIC LOGIC UNIT

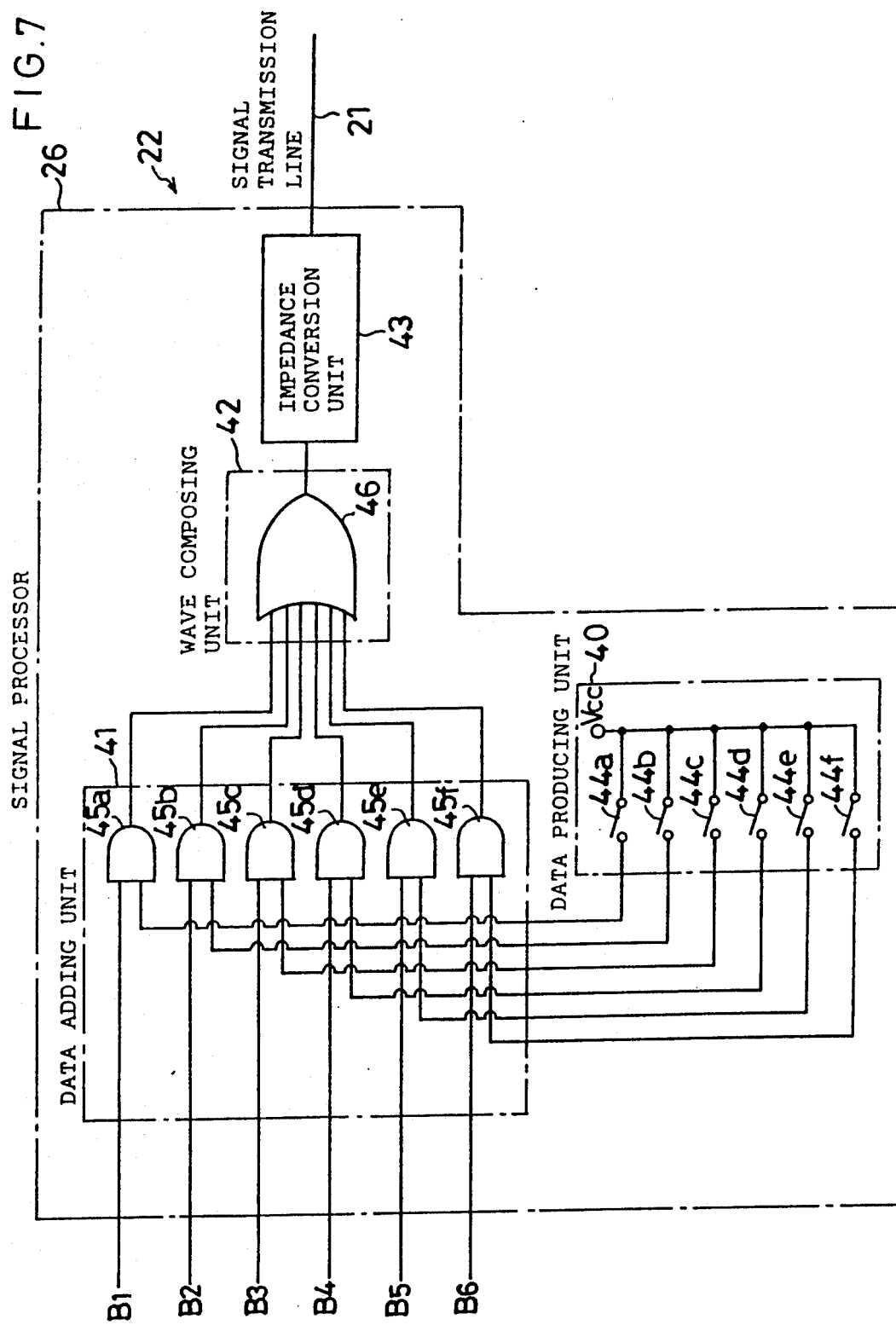

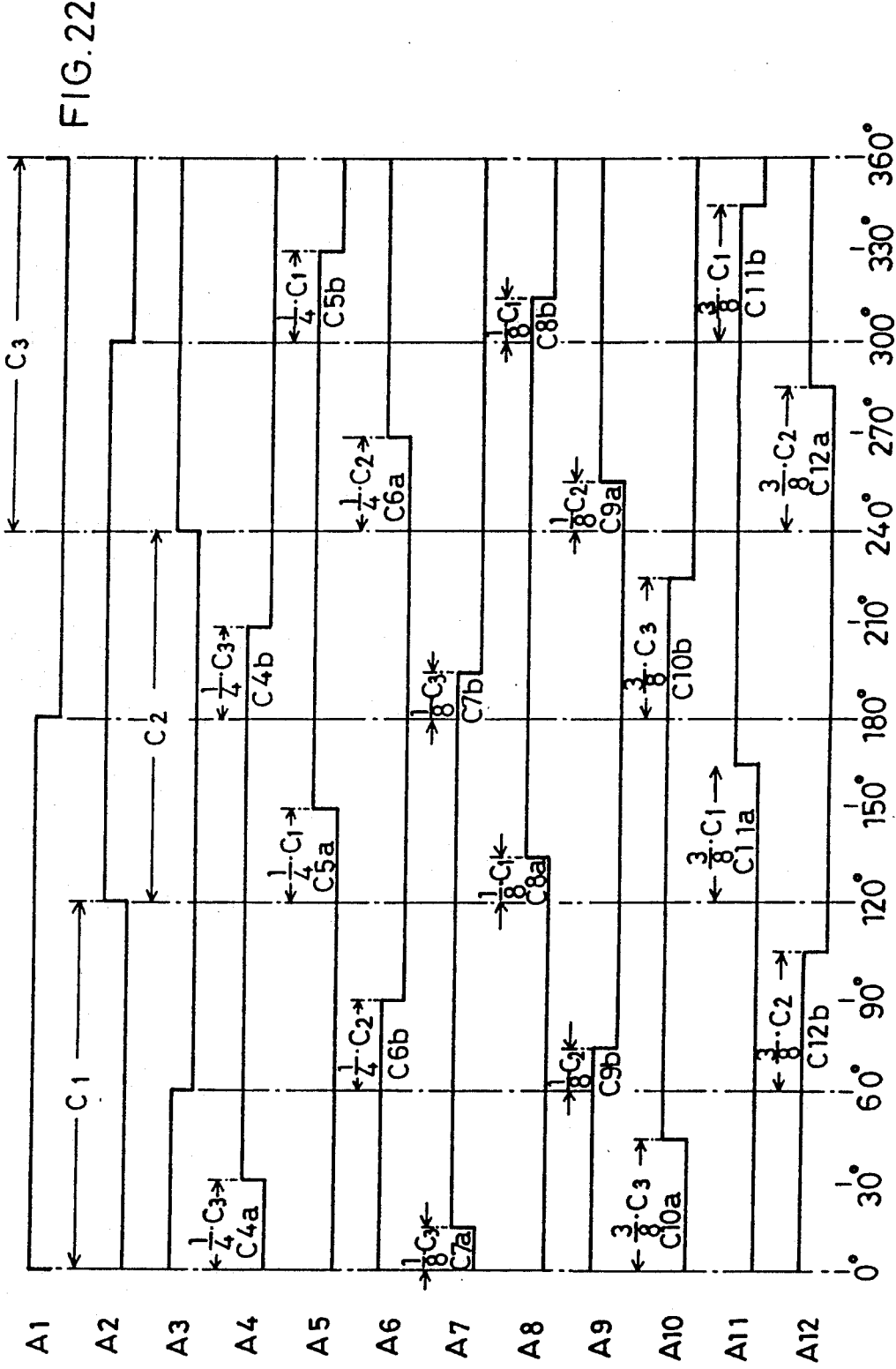

MULTIPLEX TRANSMITTER-RECEIVER SYSTEM

BACKGROUND OF THE INVENTION

1. Field of the Invention

The present invention relates to multiplex transmitter-receiver systems for transmitting and/or receiving a plurality of signals through a single transmission line. The term "transmitter-receiver system", as used herein, refers to a system adapted for at least either or both of the transmission and receiving of signals.

2. Description of the Related Art

FIG. 27 schematically shows two transmitter-receiver systems 2 and 3 connected to a three-phase a.c. power supply 1 and interconnected by a single signal transmission line 5.

The first transmitter-receiver system 2 is used specifically for transmitting signals (transmitter), and the second transmitter-receiver system 3 for receiving signals (receiver). These systems are disclosed, for example, in Unexamined Japanese Patent Publications SHO 51-78112.

The transmitter 2 comprises a synchronizing signal generating circuit 4 for producing six transmission synchronizing signals from a three-phase alternating current, and a transmission circuit (transmission signal processing circuit) 6 for transmitting a plurality of signals as selected from among these synchronizing signals through the single transmission line 5. The receiver 3 comprises a synchronizing signal generating circuit 7 for producing six receiving synchronizing signals from the three-phase alternating current like the circuit 4, and a receiving circuit (receiving signal processing circuit) 8 for receiving a plurality of signals through the single transmission line 5 based on these synchronizing signals. The synchronizing signal generating circuits 4, 7 of the transmitter 2 and the receiver 3 respectively comprise signal a.c. power supply circuits 10, 11 for obtaining three signal a.c. power supplies from the three-phase alternating current using a transformer, and diode matrix circuits 12, 13 for producing six synchronizing signals by clipping these three signal a.c. power supplies with signal a.c. power supplies which are different from one another by 120 degrees in phase and taking out the superposed portions of the waveforms.

However, the conventional transmitter-receiver systems 2, 3 described above require a transformer for the signal a.c. power supply circuits 10, 11 of the circuits 4, 7, and are therefore large-sized and heavy. Further since the diode matrix circuits 12, 13 produce six synchronizing signals from the three a.c. power supplies, the systems are limited in the number of synchronzing signals producible and accordingly in the number of signals which can be transmitted through the single transmission line 5. Furthermore, the synchronizing signals are not available with high accuracy owing to the distortion of waveforms since the synchronizing signals are afforded by the a.c. power supplies.

SUMMARY OF THE INVENTION

An object of the present invention is to provide a muliplex transmitter-receiver system which can transmit and/or receive a multiplicity of signals through a single signal transmission line and which can nevertheless be lightweight.

The multiplex transmitter-receiver system of the invention comprises synchronizing signal generating means for producing a plurality of multiplex transmission-receiving synchronizing signals from a three-phase alternating current, and signal processing means for effecting signal processing based on the synchronizing signals for transmitting and/or receiving a plurality of signals through a single signal transmission line, the system being characterized in that the synchronizing signal generating means comprises a transformerless polyphase rectangular wave generating means for producing polyphase rectangular waves by shaping the waveform of the three-phase alternating current, and arithmetic logic means for producing a plurality of multiplex transmission-receiving synchronizing signals by logic elements based on combinations of the polyphase rectangular waves.

The polyphase rectangular wave generating means of the synchronizing signal generating means shapes the waveform of the three-phase alternating current to produce polyphase rectangular waves, and therefore requires no transformer for producing the polyphase rectangular waves of increased phase number. The arithmetic logic means of the generating means produces a plurality of multiplex transmission-receiving synchronizing signals from combinations of the polyphase rectangular waves by logic elements, with the result that the synchronizing signals can be produced with high accuracy. The logic elements used for producing the synchronizing signals are readily capable of handling a different number of signals in the event of a change in the number of signals and can yet be easily provided in the form of an IC (integrated circuit).

With the transmitter-receiver system of the present invention, the polyphase rectangular wave generating means of the synchronizing signal generating means is adapted to produce polyphase rectangular waves increased in the number of phases without using any transformer, and the arithmetic logic means to produce many multiplex transmission-receiving synchronizing signals with high accuracy from the polyphase rectangular waves as described above. This makes it possible to transmit and/or receive many signals through a single signal transmission line. Since the synchronizing signal generating means requires no transformer and since the logic elements of the arithmetic logic means can be readily provided in the form of an IC, the system can be made lightweight.

The polyphase rectangular wave generating means may comprise waveform shaping means for producing three-phase rectangular waves by shaping the waveform of the three-phase alternating current. The three-phase rectangular waves are therefore readily available merely by waveform shaping. In the case where the polyphase rectangular wave generating means produces three-phase rectangular waves, six synchronizing signals, for example, can be produced by the arithmetic logic means.

The polyphase rectangular wave generating means may comprise waveform shaping means for producing three-phase rectangular waves by shaping the waveform of the three-phase alternating current, and means for preparing polyphase rectangular waves at least six in the number of phases from the three-phase rectangular waves. It is then possible to produce polyphase rectangular waves having a very large number of phases. In this case, an indefinite number of polyphase rectangular waves, a multiple of three in number, can be produced by the wave preparing means. The arithmetic logic means can then produce synchronizing signals which are twice that number in number, for example.

The waveform shaping means may comprise three light-emitting diodes connected to a three-phase alternating current supply, and three phototransistors provided for the light-emitting diodes, respectively. This serves to eliminate the influence of noise.

The polyphase rectangular wave preparing means may comprise an oscillator for producing pulses having a predetermined period, and counting means having pulse counters for counting up pulses from the oscillator, and the counting means prepares new rectangular waves which are different from the original rectangular waves in phase by determining the difference in phase between the three-phase rectangular waves using the pulse counters and calculating a new phase difference from the difference in phase. The system can then produce polyphase rectangular waves of many phase number readily from the three-phase rectangular waves.

The polyphase rectangular wave generating means may comprise waveform shaping means for producing six-phase rectangular waves by shaping the waveform of the three-phase alternating current.

The waveform shaping means may comprise six light-emitting diodes delta- and wye-connected to a three-phase alternating current supply, and six photo-transistors provided for the light-emitting diodes, respectively. This serves to eliminate the influence of noise, and the arrangement nevertheless readily produces six-phase rectangular waves, so that the rectangular wave preparing means need not always be provided.

BRIEF DESCRIPTION OF THE DRAWINGS

FIG. 4 is a block diagram showing an arithmetic logic unit;

FIG. 5 is a time chart showing polyphase rectangular waves;

FIG. 7 is a block diagram showing an example of signal processor of the first transmitter-receiver signal;

FIG. 22 is a time chart showing the polyphase rectangular waves;

DESCRIPTION OF THE PREFERRED EMBODIMENTS

Embodiments of the present invention will be described below with reference to the accompanying drawings.

Figure 1:
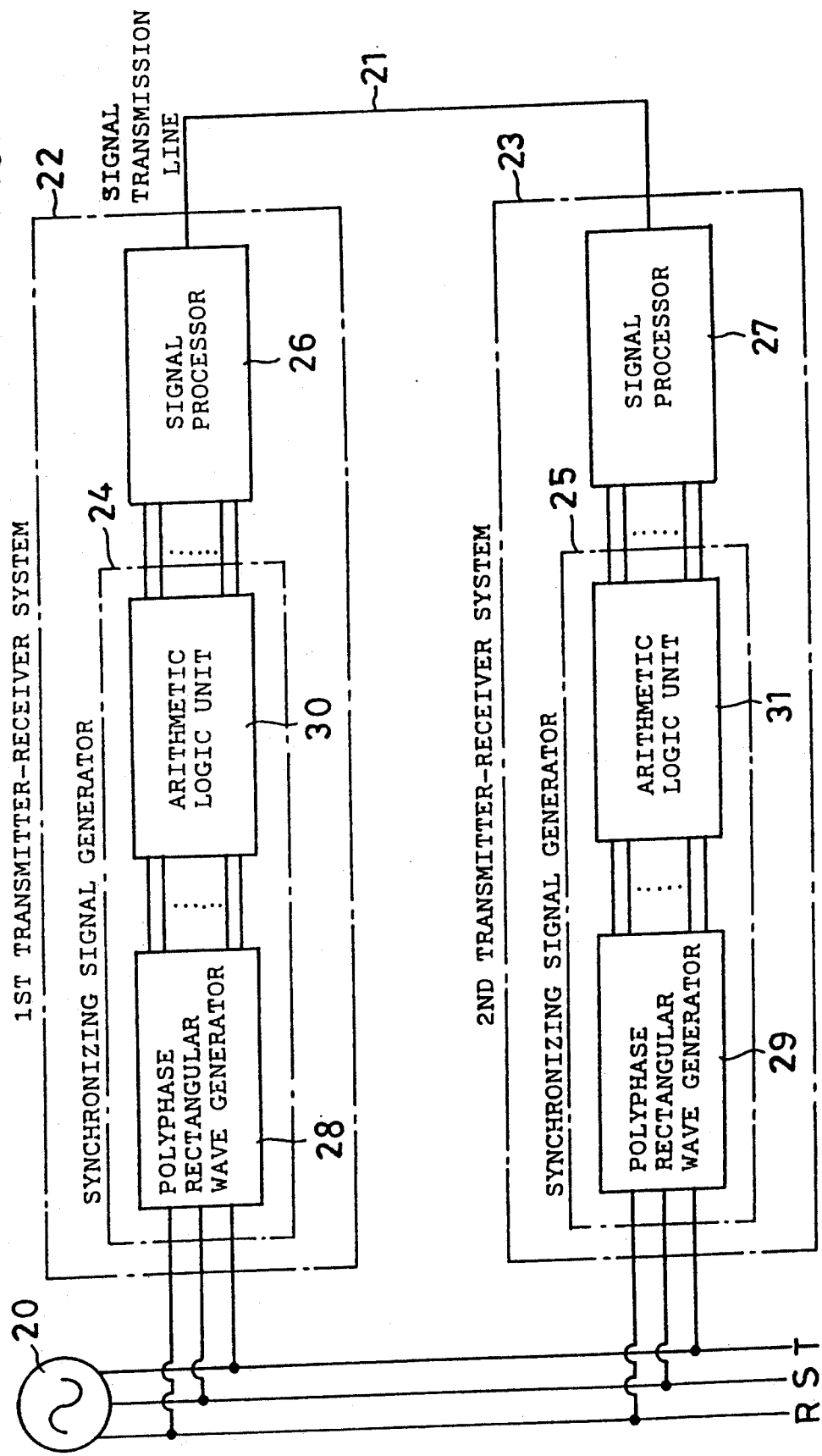
FIG. 1 is a block diagram of two transmitter-receiver systems embodying the present invention.

FIG. 1 schematically shows two transmitter-receiver systems 22, 23 connected to a three-phase a.c. power supply 20 and interconnected by a single signal transmission line 21.

The systems 22, 23 respectively comprise synchronizing signal generators 24, 25 serving as synchronizing signal generating means, and signal processors 26, 27 serving as signal processing means.

The signal generators 24, 25, which are adapted to produce a plurality of multiplex transmission-receiving synchronizing signals from a three-phase alternating current, respectively comprise polyphase rectangular wave generators 28, 29 serving as polyphase rectangular wave generating means, and arithmetic logic units 30, 31 serving as arithmetic logic means. The wave generators 28, 29 are designed to produce polyphase rectangular waves by shaping the waveform of the three-phase alternating current. The arithmetic logic units 30, 31 produce a plurality of synchronizing signals from combinations of the polyphase rectangular waves by means of logic elements.

The signal processors 26, 27 effect signal processing based on the synchronizing signals for transmitting and/or receiving a plurality of signals through the single transmission line 21.

Figure 2:
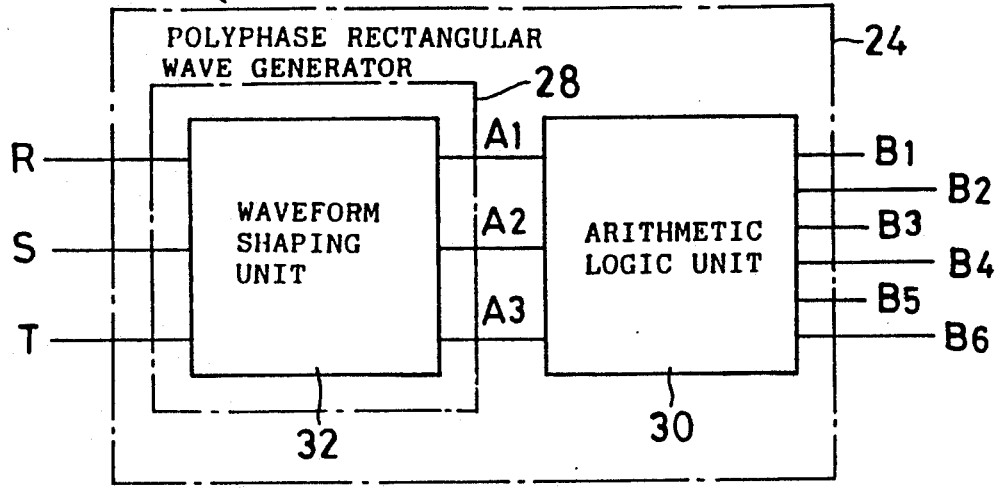
FIG. 2 is a block diagram showing an example of synchronizing signal generator of the first transmitter-receiver system.

FIG. 2 shows an example of synchronizing signal generator 24 of the first transmitter-receiver system 22 of FIG. 1.

The polyphase rectangular wave generator 28 of the generator 24 comprises a waveform shaping unit 32 serving as waveform shaping means. This unit 32 shapes the waveform of the R, S and T waves of the three-phase alternating current to produce three-phase rectangular waves A1, A2 and A3 which are different from one another by 120 degrees in phase (see FIG. 5). The arithmetic logic unit 30 produces six synchronizing signals B1, B2, B3, B4, B5 and B6 from the rectangular waves A1 to A3 (see FIG. 5).

Figure 3:
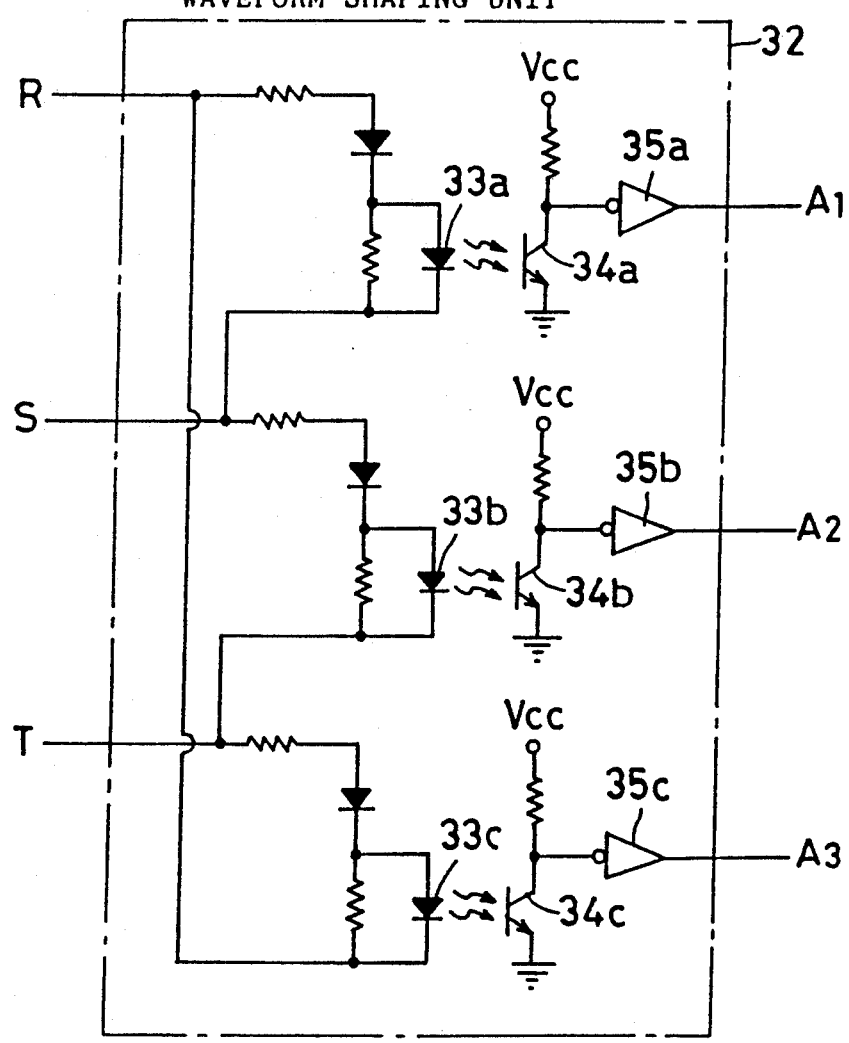
FIG. 3 is a block diagram showing an example of waveform shaping unit.

FIG. 3 shows an example of waveform shaping unit 32 of FIG. 2.

Light-emitting diodes 33a, 33b, 33c are delta-connected to the R, S and T phases of the three-phase a.c. power. Three phototransistors 34a, 34b, 34c are provided for these light-emitting diodes 33a to 33c to form photocouplers therewith and are connected to Schmitt trigger circuits 35a, 35b, 35c, respectively. As seen in FIG. 5, these Schmitt trigger circuits 35a to 35c deliver three-phase rectangular waves A1 to A3 which are 120 degrees different from one another in phase.

FIG. 4 shows an example of arithmetic logic unit 30 of FIG. 2.

This arithmetic logic unit 30 produces six synchronizing signals B1 to B6 shown in FIG. 5 from the three-phase rectangular waves A1 to A3 of the same drawing in accordance with the following truth table, and has six AND circuits 36a, 36b, 36c, 36d, 36e and 36f.

|    | A1 | A2 | A3 |
|----|----|----|----|
| B1 | 1  | 0  | 1  |
| B2 | 1  | 0  | 0  |
| B3 | 1  | 1  | 0  |
| B4 | 0  | 1  | 0  |
| B5 | 0  | 1  | 1  |
| B6 | 0  | 0  | 1  |

This truth table indicates that only when A1, A2 and A3 are 1 (on), 0 (off) and 1, respectively, B1 is 1. The same is true of B2 to B6. The rectangular waves A1 to A3 are fed to AND circuits 36a to 36f, via NOT circuits 37 as required, so that the outputs B1 to B6 of the six AND circuits 36a to 36f will be on when the truth table is satisfied, whereby the six synchronizing signals B1 to B6 are obtained which are on successively for one-sixth (phase 60 degrees) of the period (phase 360 degrees).

Figure 6:
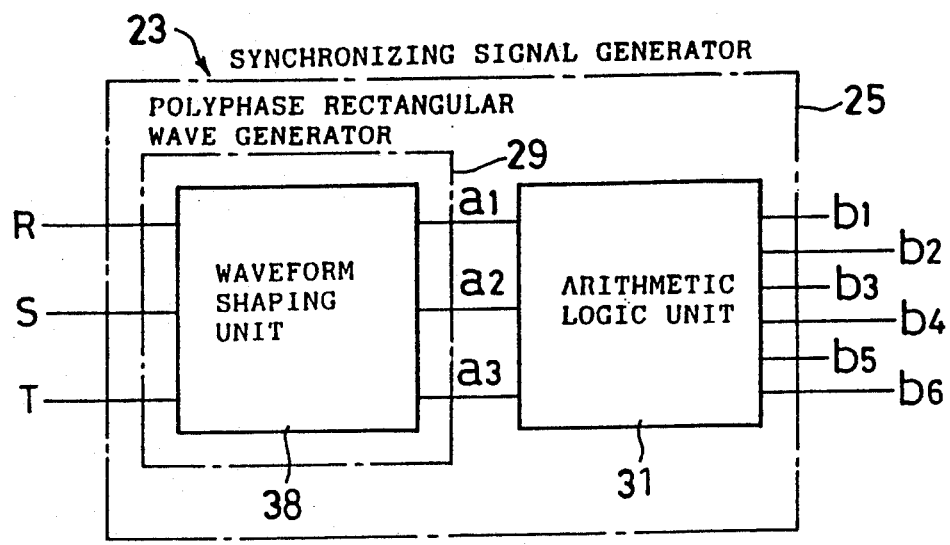
FIG. 6 is a block diagram showing an example of synchronizing signal generator of the second transmitter-receiver system.

FIG. 6 shows an example of synchronizing signal generator 25 of the second transmitter-receiver system 23 of FIG. 1.

The synchronizing signal generator 25 is the same as the synchronizing signal generator 24 of the first transmitter-receiver system 22 and has a polyphase rectangular wave generator 29 comprising a waveform shaping unit 38, by which the waveform of the R, S and T waves of the three-phase alternating current is shaped to produce rectangular waves a1, a2 and a3 of three phases which are the same as the waves A1, A2 and A3. An arithmetic logic unit 31 then produces six polyphase transmission-receiving synchronizing signals b1, b2, b3, b4, b5 and b6 which are the same as the signals B1 to B6.

Figure 8:
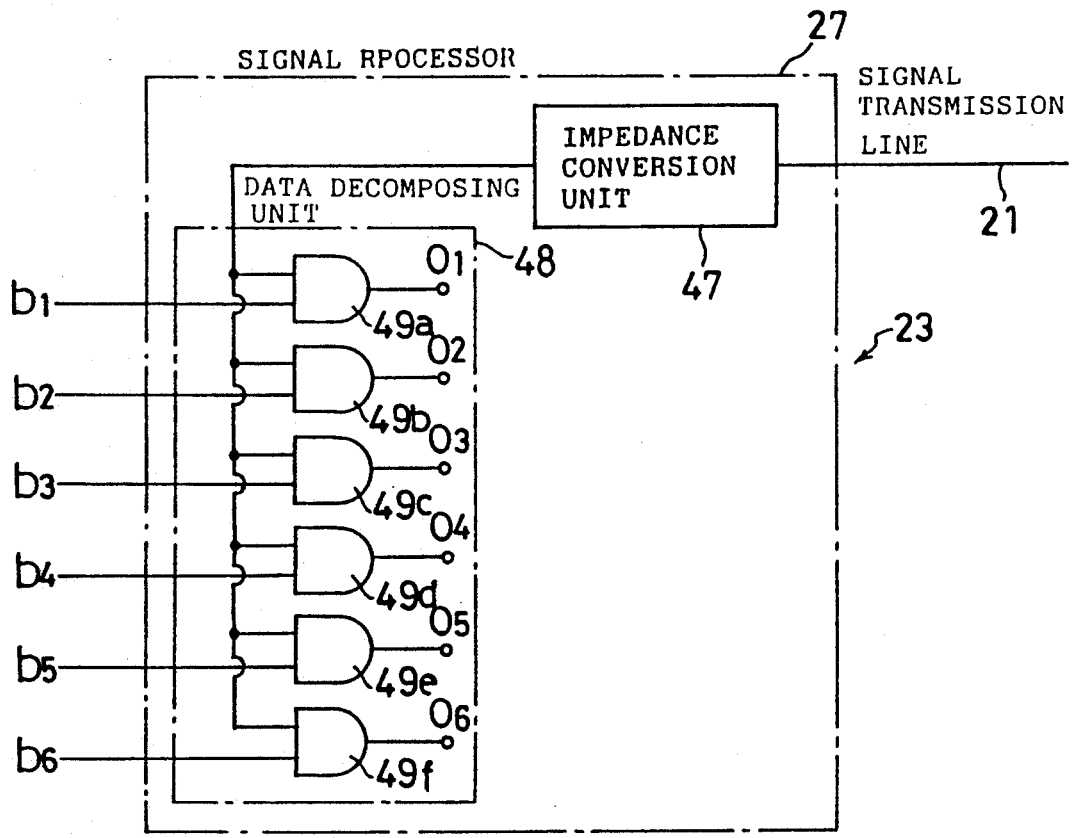
FIG. 8 is a block diagram showing an example of signal processor of the second transmitter-receiver system.

FIG. 7 shows an example of signal processor 26 of the first transmitter-receiver system 22 of FIG. 1, and FIG. 8 an example of signal processor 27 of the second transmitter-receiver system 23. In this case, the first system 22 is used solely for transmission, and the second system 23 for receiving.

With reference to FIG. 7, the signal processor 26 of the first system 22 comprises a data producing unit 40, data adding unit 41, wave composing unit 42 and impedance conversion unit 43. The data producing unit 40 has six switches 44a, 44b, 44c, 44d, 44e and 44f connected to a signal power supply Vcc. The data adding unit 41 has six AND circuits 45a, 45b, 45c, 45d, 45e and 45f, which receive an output from the six switches 44a to 44f of the data producing unit 40 and the six synchronizing signals B1 to B6, respectively. The wave composing unit 42 comprises an OR circuit 46 which receives outputs from the six AND circuits 45a to 45f of the data adding unit 41. The impedance conversion unit 43 delivers the output from the OR circuit 46 of the wave composing unit 42 to the transmission line 21 on impedance conversion.

As already stated, the six synchronizing signals B1 to B6 are successively on each for one-sixth of every period. For example, when the signal B1 is on, the other signals B2 to B6 are off, and the corresponding second to sixth AND circuits 45b to 45f produce no output. If the first switch 44a is then on (closed), the first AND circuit 45a produces an output, whereas if the first switch 44a is off (open), the first AND circuit 45a produces no output. Thus, while the first synchronizing signal B1 is on, the data adding unit 41 delivers the on-off data of the first switch 44a to the transmission line 21 through the OR circuit 46 and the impedance conversion unit 43. Similarly, while each of the signals B2 to B6 is on, the data adding unit 41 delivers the on-off data of the corresponding one of the switches 44b to 44f via the OR circuit 46 and the impedance conversion unit 43 to the transmission line 221. In this way, the on-off data of the six switches 44a to 44f is successively delivered to the transmission line 21 every period.

With reference to FIG. 8, the signal processor 27 of the second transmitter-receiver system 27 comprises an impedance conversion unit 47 and a data decomposing unit 48. The data decomposing unit 48 has six AND circuits 49a, 49b, 49c, 49d, 49e and 49f, which receive the six synchronizing signals b1 to b6. Inputs from the transmission line 21 are subjected to impedance conversion by the unit 47 and fed to the data decomposing unit 48, i.e., to the six AND circuits 49a to 49f, which produce outputs, i.e., six outputs 01, 02, 03, 04, 05 and 06 of the signal processor 27.

As already stated, the six synchronizing signals b1 to b6 are successively on each for one-sixth of every period in synchronizm with the synchronizing signals B1 to B6, For example, while the first signal b1 is on, the other signals b2 to b6 are off, and the corresponding second to sixth AND circuits 49b to 49f produce none of the ouputs 02 to 06. At this time, the synchronizing signal B1 is on, and the on-off data of the first switch 44a of the data producing unit 40 is transmitted from the first system 22 and delivered as the first output 01 from the first AND circuit 49a. Similarly, while each of the signal b2 to b6 is on, the on-off data of the corresponding one of the switches 44b to 44f is delivered from the corresponding one of the second to sixth AND circuits 49b to 49f as one of the second to sixth outputs 02 to 06 concerned. In this way, on-off data of the six switches 44a to 44f is successively delivered every period.

For the first transmitter-receiver system 22, the arithmetic logic unit 30 of FIG. 4 and the data adding unit 41 and the wave composing unit 42 of FIG. 7 can be collectively provided as a single IC. Further to provide the second transmitter-receiver system 23, the arithmetic logic unit 31 of FIG. 6 which is similar in construction to the arithmetic logic unit 30 of FIG. 4 and the data decomposing unit 48 of FIG. 8 can be collectively fabricated as a single IC.

Figure 9:
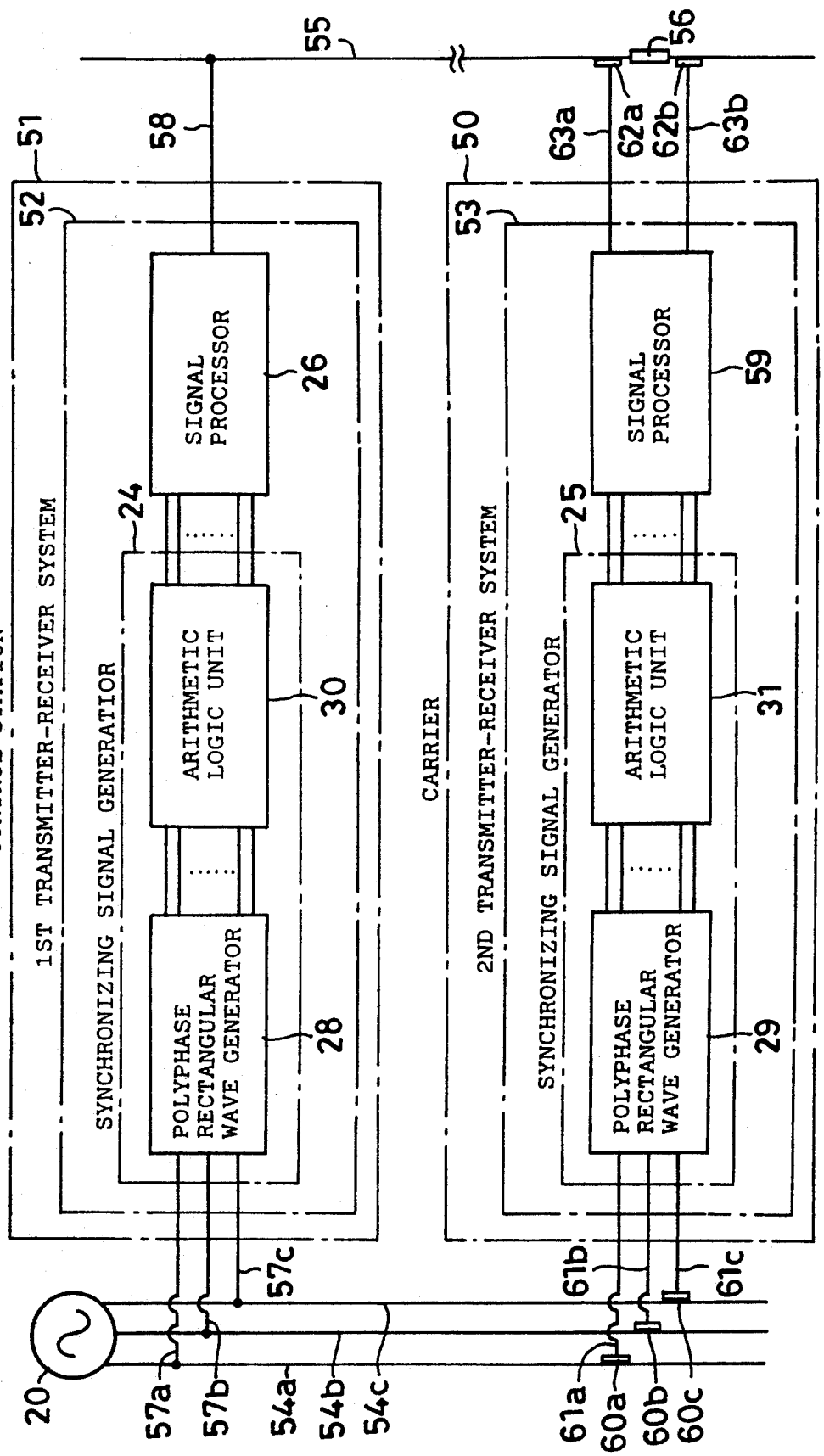
FIG. 9 is a block diagram of two transmitter-receiver systems as another embodiment of the invention.

FIG. 9 shows an embodiment of the present invention for use in a conveyor having self-propelled carriers.

Although not shown in detail, the conveyor comprises a plurality of self-propelled carriers 50 adapted to travel along a running rail, and a control station 51 on the ground. The control station 51 has a first transmitter-receiver system 52, and the carrier 50 is provided with a second transmitter-receiver system 53.

The rail is provided with three power supply lines 54a, 54b, 54c and a single signal transmission line 55. The transmission line 55 is divided into a plurality of sections by insulators 56.

The first transmitter-receiver system 52 comprises a synchronizing signal generator 24 and a signal processor 26. The signal generator 24 is the same as the one shown in FIGS. 2 to 4. The signal generator 26 is the same as the one shown in FIG. 7. Three power supply lines 57a, 57b, 57c are fixedly connected to the power supply lines 54a, 54b, 54c along the rail, respectively. A signal transmission line 58 for the signal processor 26 is fixedly connected to the signal transmission line 55 on the rail.

The first transmitter-receiver system 52 is provided for each section of the transmission line 55 on the rail, so that the signal to be transmitted differs from section to section although only one system 52 is shown in FIG. 9.

The second transmitter-receiver system 53 comprises a synchronizing signal generator 25 and a signal processor 59. The signal generator 25 is the same as the synchronizing signal generator 24 of the first system 52. The carrier 50 has three collectors 60a, 60b, 60c slidable in contact with the respective power supply lines 54a, 54b, 54c on the rail and having connected thereto power supply lines 61a, 61b, 61c for the polyphase rectangular wave generator 29 of the signal generator 25. The carrier 50 has front and rear two collectors 62a, 62b slidable in contact with the transmission line 55 on the rail and having connected thereto two signal transmission lines 63a, 63b for the signal processor 59. The width along the rail of the collectors 62a, 62b is smaller than the width along the rail of the insulators 56, and the spacing between the two collectors 62a, 62b is larger than the width along the rail of the insulators 56. Accordingly, the single collector 62a or 62b will not contact two sections of the transmission line 55 on the front and rear sides of the insulator 56 at the same time, nor will the two collectors 62a, 62b simultaneously contact the insulator 56. Thus, at least one of the collectors 62a, 62b is in contact with the transmission line 55.

Figure 10:
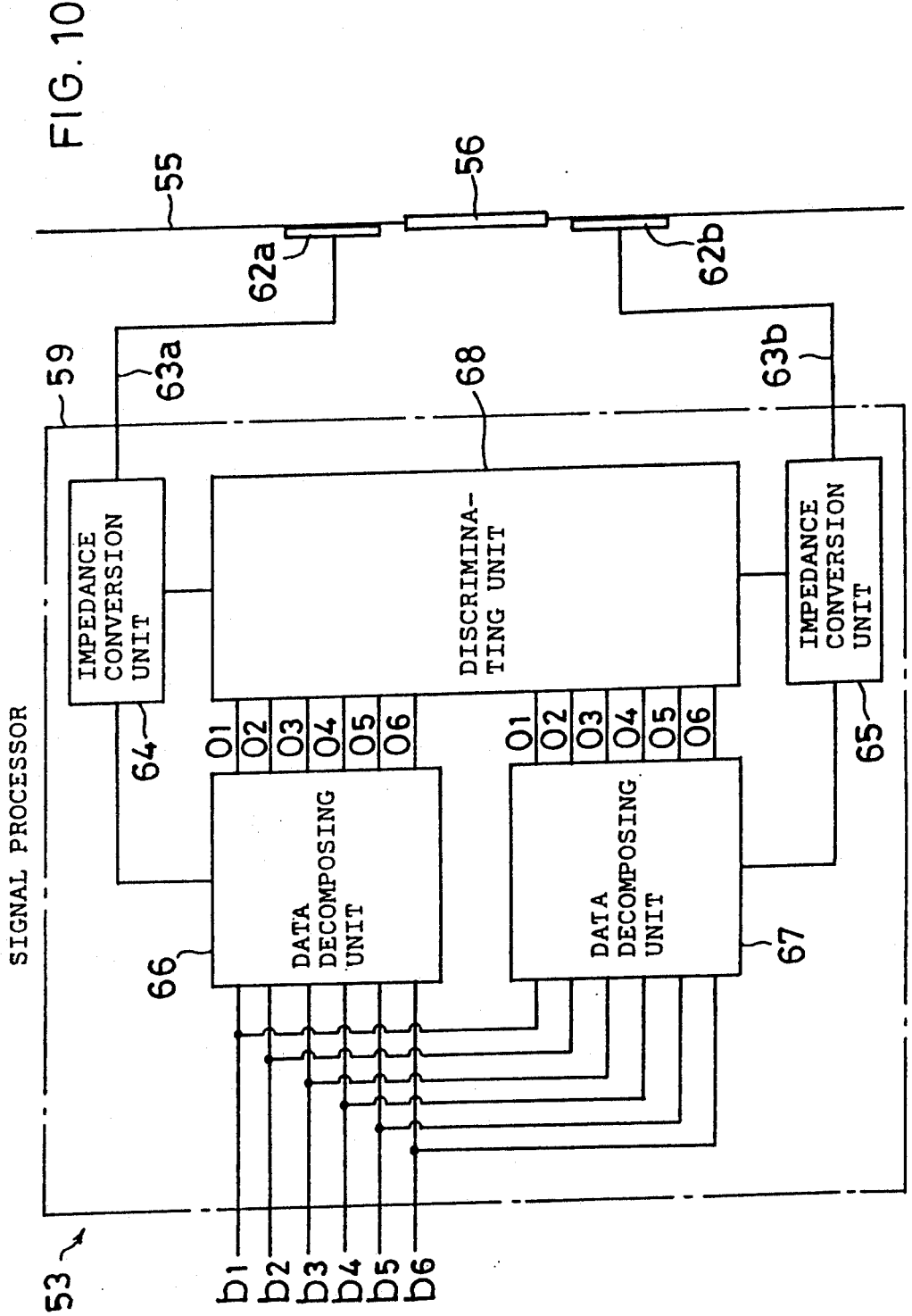
FIG. 10 is a block diagram showing an example of signal processor of the second transmitter-receiver system.

As seen in FIG. 10, the signal processor 59 of the second transmitter-receiver 53 comprises two impedance conversion units 64, 65, two data decomposing units 66, 67 and a discrimanating unit 68. The data decomposing units 66, 67 is the same as the unit 48 of FIG. 8. The front data decomposing unit 66 decomposes a signal sent forward through the front collector 62a, the front transmission line 63a and the front impedance conversion unit 64 and feeds six outputs 01 to 06 to the discriminating unit 68. The rear data decomposing unit 67 decomposes a signal sent forward through the rear collector 62b, the rear transmission line 63b and the rear impedance conversion unit 65 and feeds six outputs 01 to 06 to the discriminating unit 68. The unit 68 stores the signals from the two data decomposing units 66, 67 in a register or like memory, and the desired signal is selected from the stored signals by a predetermined procedure.

The front and rear two collectors 62a, 62b are provided on the carrier 50 for the discriminating unit 68 to select the desired signal from those fed through these collectors. This ensures the transmission of the required signal at all times by precluding interruption of signal transmission at the portion of insulator 56 of the transmission line 55 on the rail or interruption of signal transmission due to improper contact of the collector 62a or 62b with the line 55. When the collector 62a or 62b of the carrier 50 is in contact with the insulator 56, no signal is transmitted through that collector 62a or 62b to result in a loss of data, whereas since the two collectors 62a, 62b are unlikely to come into contact with the insulator 56 at the same time as described above, the signal can be transmitted through the collector 62a or 62b which is out of contact with the insulator 56. In the case where the collector 62a or 62b is not in proper contact with the transmission line 55 if not in contact with the insulator 56, the signal can be transmitted through the other collector 62a or 62b which is not in improper contact with the line.

While the front and rear collectors 62a, 62b are in contact with the same section of the transmission line 55 on the rail, the two data decomposing units 66, 67 deliver the same signals to the discriminating unit 68. However, when the front and rear collectors 66, 67 are in contact with different sections which are interconnected by the insulator 56, it is likely that the two data decomposing units 66, 67 feed different signals to the discriminating unit 68. In the case where the signals from the two data decomposing units 66, 67 are identical, either signal may be selected, but if they are different, there is a need to select the desired signal. Further in the event of occurrence of an error such as a loss of data mentioned above, the proper signal needs to be selected. Accordingly, the discriminating unit 68 is adapted to detect errors and select the desired signal through the predetermined procedure.

The loss of data due to the failure of the collector 62a or 62b to contact the transmission line 55 can be detected, for example, in the following manner.

When the collector 62a or 62b leaves the transmission line 55, a change occurs in impedance, which is detected by the impedance conversion unit 64 or 65, whereby the loss of data can be detected. Alternatively when the first transmitter-receiver 52 is adapted to transmit a specific output, e.g. output 01, which is on at all times, the output 01 is on while the collector 62a or 62b is in contact with the transmission line 55, but the output 01 is off when the collector leaves the line. This serves to detect the loss of data. Further the loss of contact due to the failure to contact can be detected also by the use of a parity bit added to the signal to be transmitted from the first system 52.

The signal selection is effected by the discriminating unit 68, for example, by the following procedure.

A priority order is given to the two collectors 62a, 62b, and the signal from either one of the collectors is selected according to the priority order and in view of the absence of an error of the collector such as a loss of data. For example, in the case where priority is given to the front collector 62a, the signal from the front collector 62a is selected if the front collector 62a is free of error. If the front collector 62a fails and further if the rear collector 62b is free of error, the signal from the rear collector 62b is selected. If the rear collector 62b also fails, the signal from the front collector 62a is selected. Incidentally, if both the collectors 62a, 62b are faulty, a required procedure can be followed such as waiting for re-transmission of signal or stopping of the carrier 50.

Figure 11:
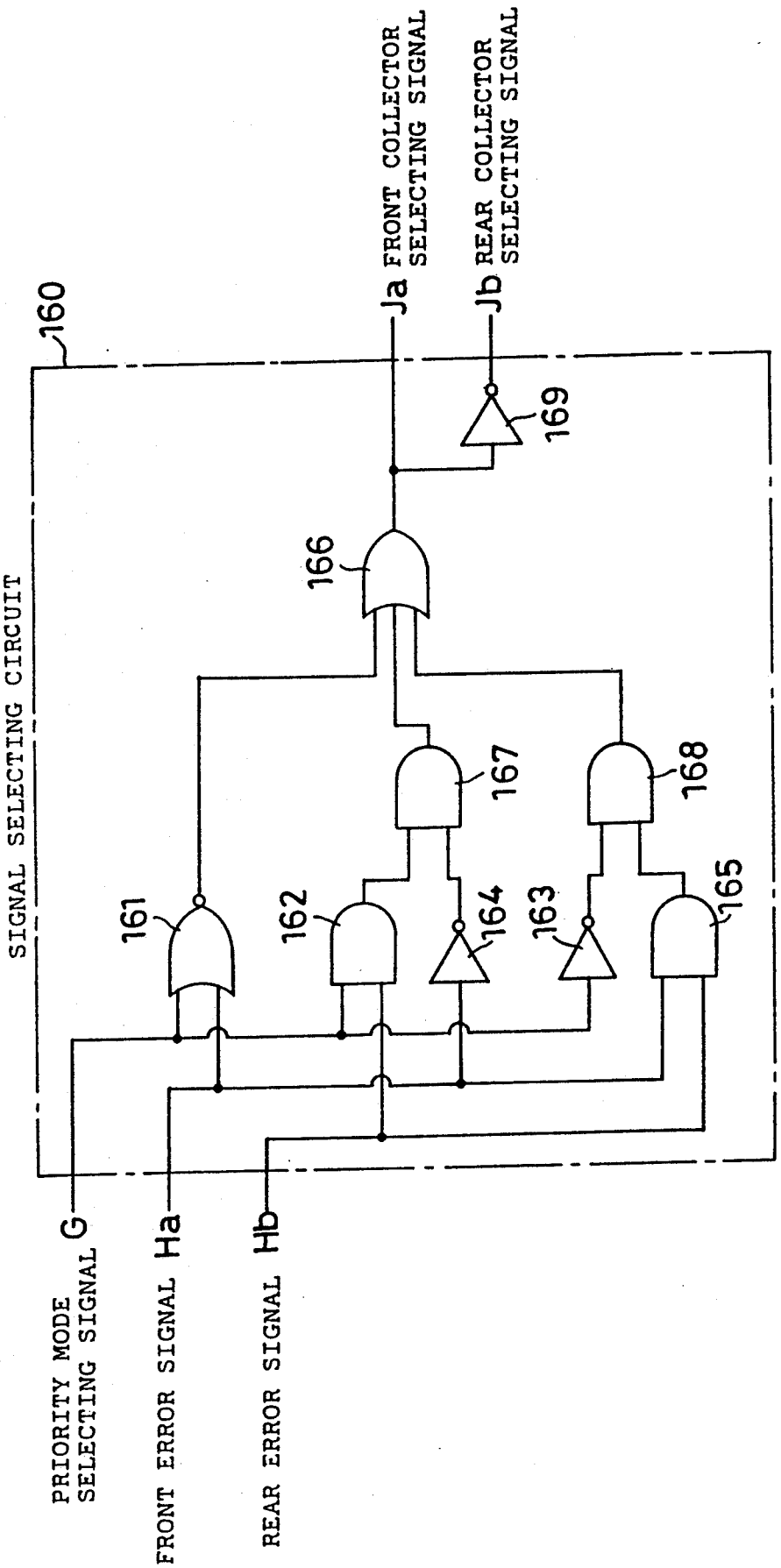
FIG. 11 is a block diagram showing an example of signal selecting circuit of a discrimanating unit.

FIG. 11 shows an example of signal selecting circuit of the discriminating unit 68 for effecting such signal selection.

With reference to FIG. 11, the signal selecting circuit 160 receives a priority mode selecting signal G and two error signals Ha, Hb and delivers a front collector selecting signal Ja and a rear collector selecting signal Jb. The selecting signal G determines the priority order of the two collectors 62a, 62b. If the front collector 62a is given priority, the signal G is off (0), whereas if the rear collector 62b is given priority, the signal is on (1). The selecting signal G is selectively changed to on or off suitably according to the carrier running mode or other conditions. The error signals Ha, Hb represent the result of detection of data loss or like error of the collectors 62a, 62b. The front collector error signal Ha is on when an error occurred in the front collector 62a, or is otherwise off. The rear collector error signal Hb is on in the event of an error occurring in the rear collector 62b, or is otherwise off.

The selecting signal G is fed to a NOR circuit 161, first AND circuit 162 and first NOT circuit 163. The front error signal Ha is fed to the NOR circuit 161, second NOT circuit 164 and second AND circuit 165. The rear error signal Hb is fed to the first AND circuit 162 and second AND circuit 165. The output of the NOR circuit 161 is fed to an OR circuit 166. The outputs of the first AND circuit 162 and the second NOT circuit 164 are fed to a third AND circuit 167, and the output of the third AND circuit 167 is given to the OR circuit 166. The outputs of the second AND circuit 165 and the first NOT circuit 163 are fed to a fourth AND circuit 168, the output of which is fed to the OR circuit 166. The output of the OR circuit 166 is the front selecting signal Ja and is fed to a third NOT circuit 169. The output of the third NOT circuit 169 is the rear selecting signal Jb.

Since the NOT circuit 169 is provided between the front selecting signal Ja and the rear selecting signal Jb, one of these selecting signals Ja, Jb is invariably on. When the front selecting signal Ja is on, the signal from the front collector 62a is selected, while when the rear selecting signal Jb is on, the signal from the rear collector 62b is selected.

The signal selecting circuit 160 operates in the following manner when priority is given to the front collector 62a.

In the case where front collector 62a is free of error:

In this case, the selecting signal G and the front error signal Ha are off, so that the output of the NOR circuit 161 is on, that is, one of the inputs to the OR circuit 166 is on. Consequently, the output of the OR circuit 166, i.e., the front selecting signal Ja, is on to select the signal from the front collector 62a. In the case where the front collector 62a produced error and the rear collector 62b is free of error:

In this case, the front error signal Ha is on, so that the output of the NOR circuit 161 is off. With the selecting signal G in off state, the output of the first AND circuit 162 is off, and the output of the third AND circuit 167 is also off. Since the rear error signal Hb is off, the output of the second AND circuit 165 is off, and the output of the fourth AND circuit 168 is also off. Because the outputs of the NOR circuit 161, third AND circuit 167 and forth AND circuit 168 are all off, the output of the OR circuit 166 is off, and the output of the third NOT circuit 169, i.e., the rear selecting signal Jb, is on to select the signal from the rear collector 62b.

When both front and rear collectors 62a, 62b produced error:

Since the selecting signal G is off in this case, the output of the first NOT circuit 163 is off. Further since the two error signals Ha, Hb are on, the output of the second AND circuit 165 is on. Thus, the outputs of the first NOT circuit 163 and the second AND circuit 165 are both on, so that the output of the fourth AND circuit 168 is on, that is, one of the inputs to the OR circuit 166 is on. Consequently, the output of the OR circuit 166, i.e., the front selecting signal Ja, is on. The signal from the front collector 62a is selected.

The signal selecting circuit 160 operates in the following manner when priority is given to the rear collector 62b.

In the case where the rear collector 62b is free of error:

The selecting signal G is on in this case, so that the outputs of the NOR circuit 161 and the first NOT circuit 163 are off. Since the output of the first NOT circuit 163 is off, the output of the fourth AND circuit 168 is also off. Further since the rear error signal Hb is off, the output of the first AND circuit 162 is off, and the output of the third AND circuit 167 is off. Thus, the outputs of the NOR circuit 161, third AND circuit 167 and fourth AND circuit 168 are all off, with the result that the output of the OR circuit 166 are off. The output of the third NOT circuit 169, i.e., the rear selecting signal Jb, is on to select the signal from the rear collector 62b.

When the rear collector 62b produced error, with the front collector 62a free of error:

The selecting signal G is on also in this case, so that the outputs of the NOR circuit 161 and the fourth AND circuit 168 are off as in the above case. Further with the selecting signal G and the rear error signal Hb in on state, the output of the first AND circuit 162 is on. Since the front error signal Ha is off, the output of the second NOT circuit 164 is off. With the outputs of the first AND circuit 162 and the second NOT circuit 164 both on, the output of the third AND circuit 167 is on. Consequently, the output of the OR circuit 166, i.e., the front selecting signal Ja, is on. The signal from the front collector 62a is selected. When front and rear collectors 62a, 62b both produced error:

Since the selecting signal G is on also in this case, the outputs of the NOR circuit 161 and the fourth AND circuit 168 are both off as in the above case. Further since the front error signal Ha is on, the output of the second NOT circuit 164 is off, and the output of the third AND circuit 167 is also off. Thus, the outputs of the NOR circuit 161, third AND circuit 167 and fourth AND circuit 168 are all off, so that the output of the OR circuit 166 is off. The output of the third NOT circuit 169, i.e., the rear selecting signal Jb, is off to select the signal from the rear collector 62b.

The method of selecting the desired signal is not limited to the above. For example, the required signal can be made selectable according to the data represented by a specific signal.

To provide the second transmitter-receiver system 53, the arithmetic logic unit 31 of FIG. 9 and the two data decomposing units 66, 67 and the discriminating unit 68 of FIG. 10 can be assembled into a single IC.

Figure 12:
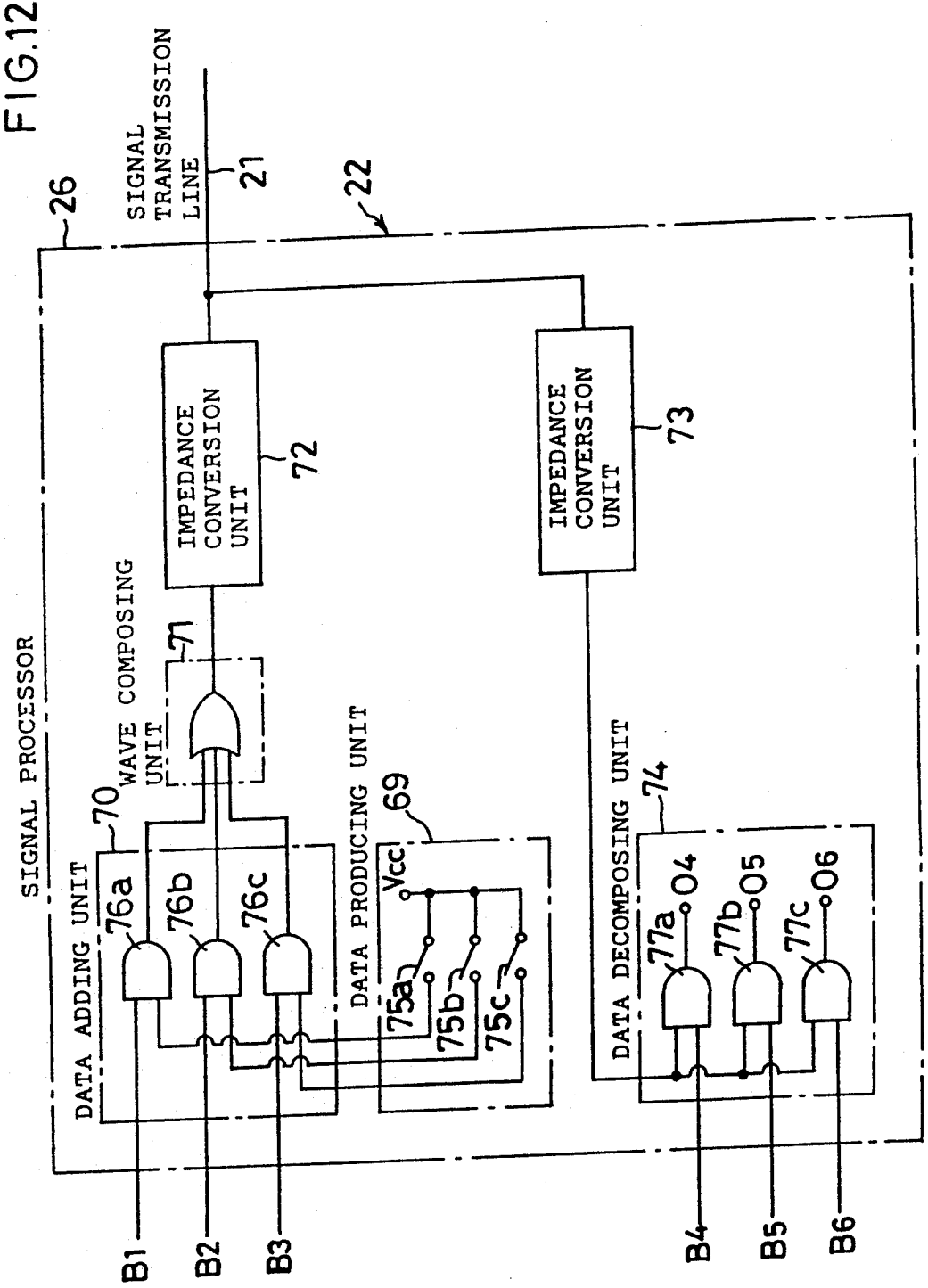
FIG. 12 is a block diagram showing an example of signal processor of the first transmitter-receiver system.
Figure 13:
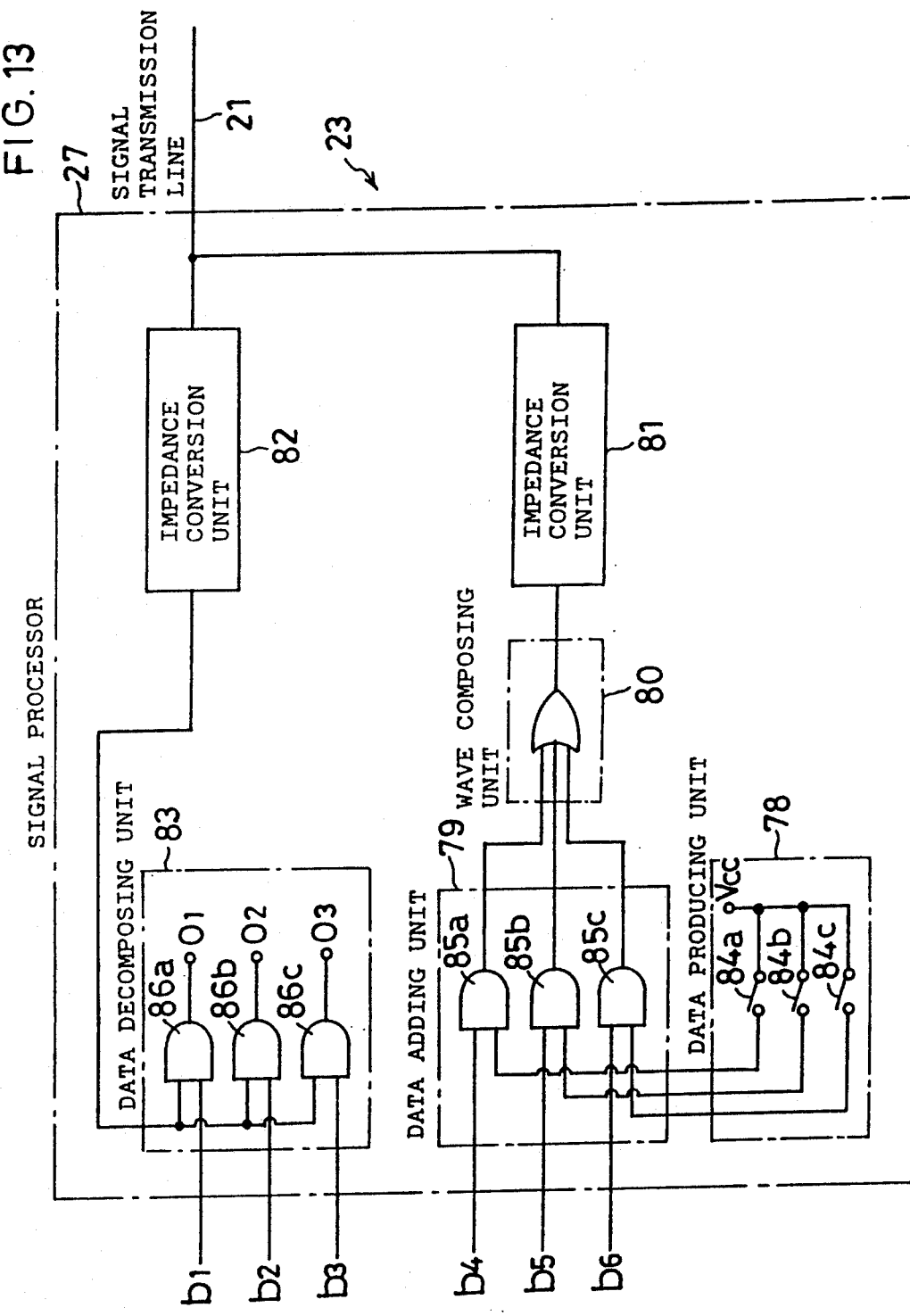
FIG. 13 is a block diagram corresponding to FIG. 12 and showing an example of signal processor of the second transmitter-receiver system.

FIGS. 12 and 13 show examples of signal processors 26, 27, respectively, in the case where the two systems 22, 23 of FIG. 1 each serve for signal transmission and receiving.

With reference to FIG. 12, the signal processor 26 of the first transmitter-receiver system 22 comprises a data producing unit 69, data adding unit 70, wave composing unit 71, two impedance conversion units 72, 73 and data decomposing unit 74. The data adding unit 70 has three AND circuits 76b, 76c for receiving an output from three switches 75a, 75b, 75c of the data producing unit 69, respectively, and the respective three synchronizing signals B1, B2 and B3. The outputs of the three AND circuits 76a to 76c of the data adding unit 70 are delivered to the transmission line 21 via the wave composing unit 71 and the impedance conversion unit 72 for transmission. The data decomposing unit 74 has three AND circuits 77a, 77b, 77c for receiving the respective three synchronizing signals B4, B5 and B6 and the output from the impedance conversion unit 73 for receiving signals.

With reference to FIG. 13, the signal processor 27 of the second transmitter-receiver system 23 comprises a data producing unit 78, data adding unit 79, wave composing unit 80, two impedance conversion units 81, 82 and data decomposing unit 83. The data adding unit 79 has three AND circuits 85a, 85b, 85c for receiving an output from three switches 84a, 84b, 84c of the data producing unit 78, respectively, and the respective three synchronizing signals b4, b5 and b6. The outputs of the three AND circuits 85a to 85c of the data adding unit 79 are delivered to the transmission line 21 via the wave composing unit 80 and the impedance conversion unit 81 for transmission. The data decomposing unit 83 has three AND circuits 86a, 86b, 86c for receiving the respective three synchronizing signals b1, b2 and b3 and the output from the impedance conversion unit 82 for receiving signals.

In the case of FIGS. 12 and 13, the on-off data of the three switches 75a to 75c of the data producing unit 69 is successively transmitted from the first system 22 and successively received by the data decomposing unit 83 of the second system 23 (outputs 01 to 03) during the first half of one period in which the synchronizing signals B1, B2 and B3 (b1, b2 and b3) are successively on. During the second half in which the synchronizing signals B4, B5 and B6 (b4, b5 and b6) are successively on, the on-off data of the three switches 84a, 84b, 84c of the data producing unit 78 is successively transmitted from the second system 23 and successively received by the data decomposing unit 74 of the first system 22 (outputs 04 to 06).

For the first transmitter-receiver system 22, the arithmetic logic unit 30 shown in FIG. 2 and having the construction of FIG. 4, and the data adding unit 70, wave composing unit 71 and data decomposing unit 74 of FIG. 12 can be assembled into a single IC. For the second system 23, the arithmetic logic unit 31 of FIG. 6 having the same construction as the logic unit 30 of FIG. 4, and the data adding unit 79, wave composing unit 80 and data decomposing unit 83 of FIG. 13 can be assembled into a single IC.

Figure 14:
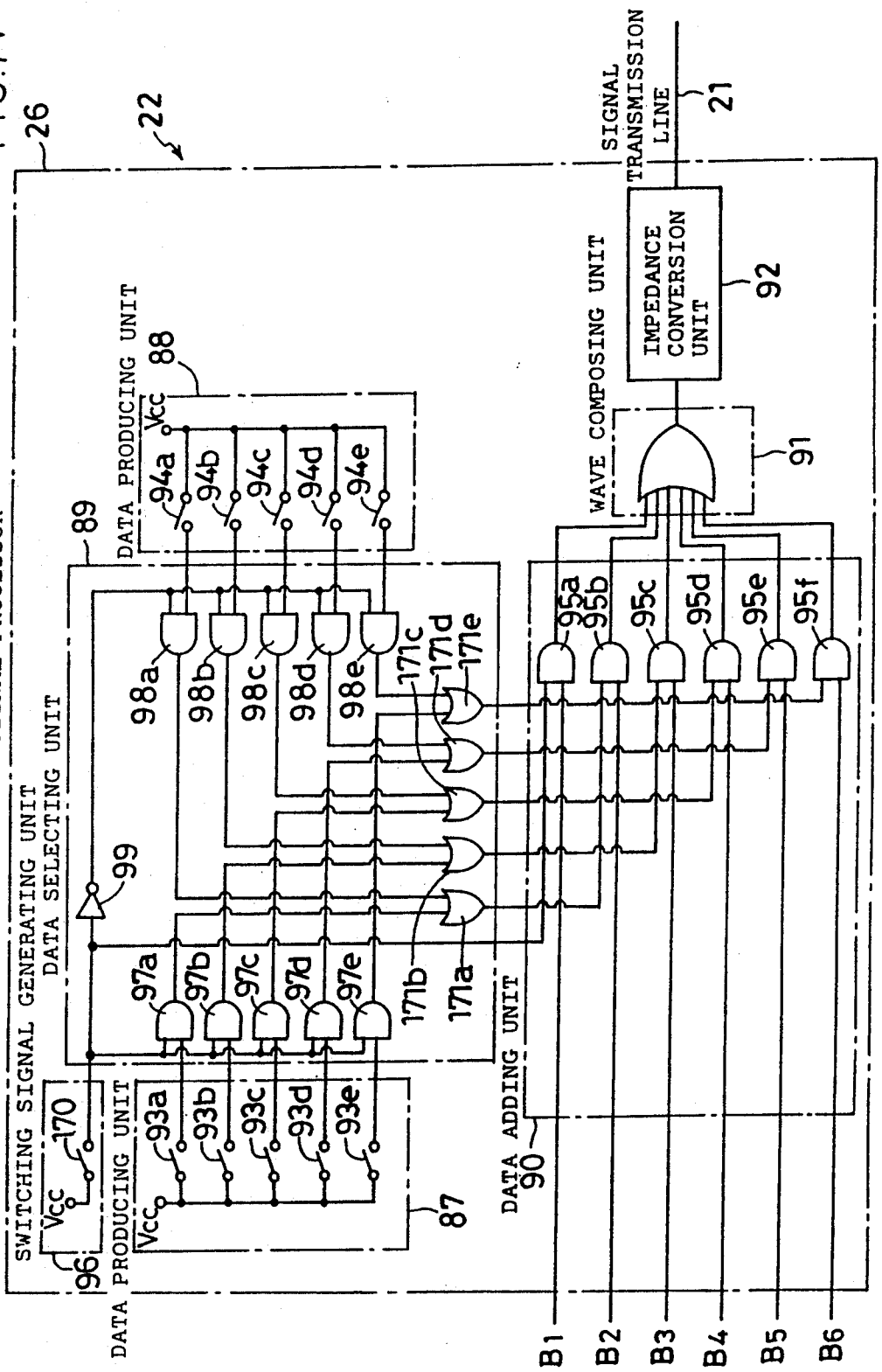
FIG. 14 is a block diagram showing an example of signal processor of the first transmitter-receiver system.
Figure 15:
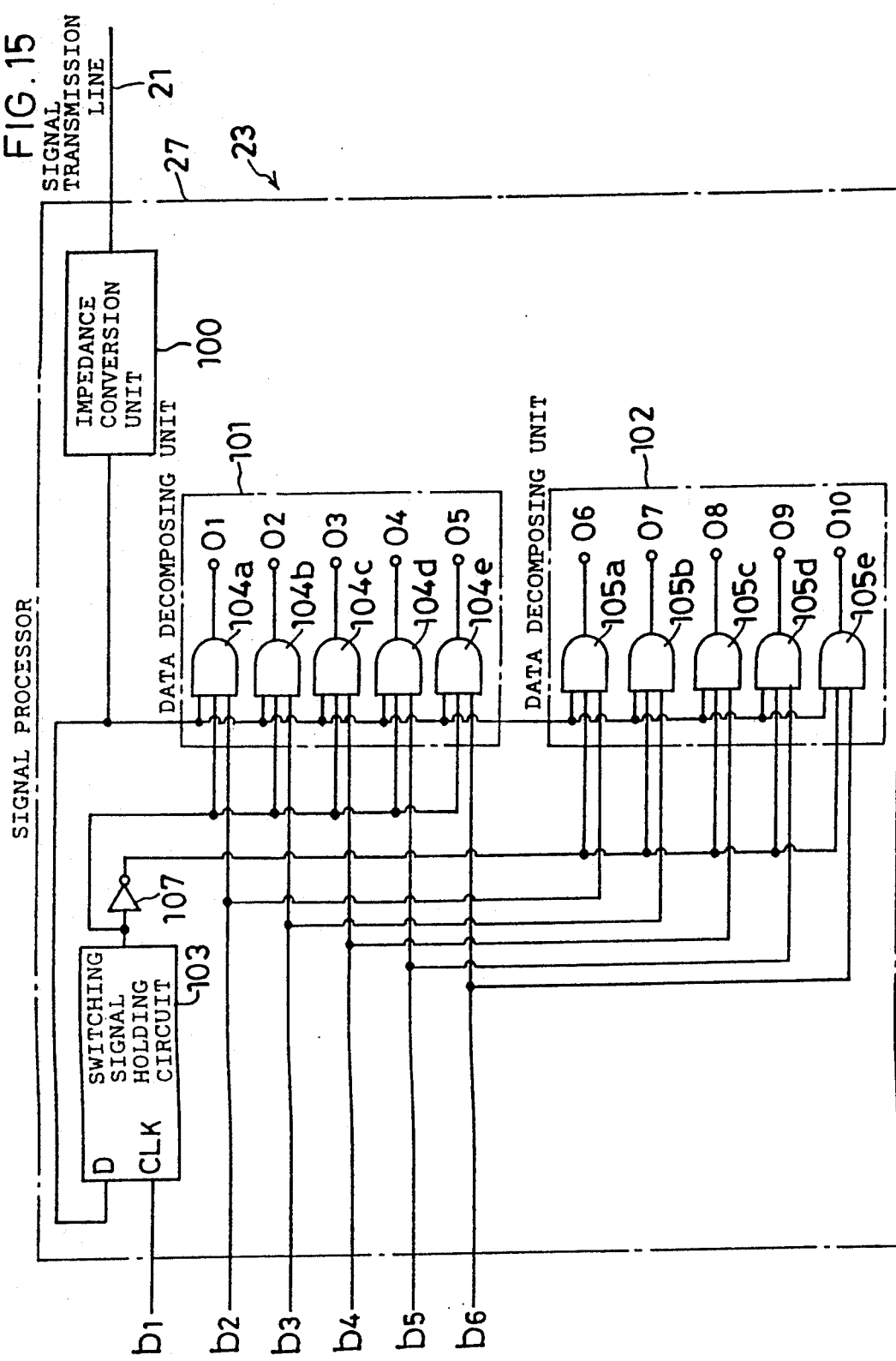
FIG. 15 is a block diagram corresponding to FIG. 14 and showing an example of signal processor of the second transmitter-receiver system.

FIGS. 14 and 15 show examples of signal processors 26, 27, respectively, in the case where the first system 22 of FIG. 1 is used specifically for transmission and the second system 23 thereof for receiving with use of six synchronizing signals for transmitting and receiving a larger number of signals.

With reference to FIG. 14, the signal processor 26 of the first transmitter-receiver system 22 comprises a switching signal generating unit 96, two data producing units 87, 88, data selecting unit 89, data adding unit 90, wave composing unit 91 and impedance conversion unit 92. The switching signal generating unit 96 has a change-over switch 170 connected to a signal power supply Vcc. The data selecting unit 89 has ten AND circuits 97a, 97b, 97c, 97d, 97e, 98a, 98b, 98c, 98d, 98e, five OR circuits 171a, 171b, 171c, 171d, 171e and one NOT circuit 99. The five AND circuits 97a to 97e of the data selecting unit 89 receive an output from five switches 93a, 93b, 93c, 93d, 93e of the first data producing unit 87, respectively, and an output from the switching signal generating unit 96. The outputs of these AND circuits 97a to 97e are fed to the five OR circuits, respectively. The output of the switching signal generating unit 96 is fed to the NOT circuit 99. The remaining five AND circuits 98a to 98e receive an output from five switches 94a, 94b, 94c, 94d, 94e of the second data producing unit 88, respectively, and the output of the NOT circuit 99. The outputs of these AND circuits 98a to 98e are delivered to the five OR circuits, respectively. The data adding unit 90 has six AND circuits 95a, 95b, 95c, 95d, 95e, 95f for receiving the six synchronizing signals B1 to B6. The output of the switching signal generating unit 96 is applied to one AND circuit 95a of the unit 90. The ouputs of the five OR circuits 171a to 171e are fed to the remaining five AND circuits 95b to 95f of the data adding unit 90, respectively.

When the synchronizing signal B1 is on, the on-off data of the change-over switch 170 of the switching signal generating unit 96 is transmitted via the AND circuit 95a of the data adding unit 90, the wave composing unit 91 and the impedance conversion unit 92. When the switch 170 is turned on, the output of the signal generating unit 96 becomes on, and the output of the NOT circuit 99 becomes off, with the result that the outputs of the five AND circuits 98a to 98e connected to the second data producing unit 88 become off. The on-off data of the switches 93a to 93e of the first data producing unit 87 is sent from the AND circuits 97a to 97e to the AND circuits 95b to 95f of the data adding unit 90 via the OR circuits 171a to 171e and successively transmitted while the synchronizing signals B2 to B6 are on one after another. When the switch 170 is turned off, the output of the switching signal generating unit 96 becomes off, so that the outputs of the five AND circuits 97a to 97e connected to the first data producing unit 87 become off, and the output of the NOT circuit 99 becomes on. The on-off data of the switches 94a to 94e of the second data producing unit 88 is sent from the AND circuits 98a to 98e to the AND circuits 95b to 95f of the data adding unit 90 via the OR circuits 171a to 171e and successively transmitted while the synchronizing signals B2 to B6 are successively on.

With reference to FIG. 15, the signal processor 27 of the second transmitter-receiver system 23 comprises an impedance conversion unit 100, switching signal holding circuit 103 and two data decomposing units 101, 102. The output of the impedance conversion unit 100 is fed to a data input terminal of the holding circuit 103, and the synchronizing signal b1 is applied to a clock input terminal of the holding circuit 103. When the clock signal is applied to the clock input terminal, the holding circuit 103 holds the state of the data signal fed to the data input terminal until another clock signal is given subsequently. The output of the impedance conversion circuit 100 is delivered to AND circuits 104a, 104b, 104c, 104d, 104e, 105a, 105b, 105c, 105d, 105e of the two data decomposing units 101, 102. The five synchronizing signals b2 to b6 are fed to these AND circuits 104a to 104e, 105a to 105e. The output of the holding circuit 103 is given to the five AND circuits 104a to 104e of the first data decomposing unit 101. Further the output of the holding circuit 103 is fed via a NOT circuit 107 to the five AND circuits 105a to 105e of the second data decomposing unit 102.

As already stated, while the synchronizing signal B1 is on, the on-off data of the switch 170 is transmitted from the first system 22 to the second system 23 and fed to the data input terminal of the switching signal holding circuit 103. In synchronism with the signal B1, the synchronizing signal b1 is also on at this time, so that the on-off data of the switch 170 fed to the data input terminal of the holding circuit 103 is held by the holding circuit 103 as an output. Thus, during one period in which the synchronizing signals B1 to B6 become on in succession, the on-off data of the switch 170 is held as the output of the holding circuit 103. Accordingly, if the switch 170 is on, the output of the holding circuit 103 is held on, so that the output of the NOT circuit 107 is off. Consequently, the outputs of the five AND circuits 105a to 105e of the second data decomposing unit 102 are off. When the switch 170 is on, the on-off data of the five switches 93a to 93e of the first data producing unit 87 is transmitted from the first system 22 while the synchronizing signals B2 to B6 are on one after another as already described. Accordingly, the data is received by the first data decomposing unit 101 succenssively while the synchronizing signals b2 to b6 are successively on (outputs 01 to 05). If the switch 170 is off, the output of the holding circuit 103 is held off. This renders the output of the five AND circuits 104a to 104e of the first data decomposing unit 101 off and the output of the NOT circuit 107 on. With the change-over switch 170 off, the on-off data of the five switches 94a to 94e of the second data producing unit 88 is transmitted from the first system 22 while the synchronizing signals B2 to B6 are on in succession as already stated. The data is successively received by the second data decomposing unit 102 (outputs 06 to 010) while the synchronizing signals b2 to b6 are on one after another.

Thus in the case of FIGS. 14 and 15, the on-off data of the five switches 93a to 93e of the first data producing unit 87 is successively transmitted from the first system 22 while the change-over switch 170 is on and successively received by the first data decomposing unit 101 of the second system 23. While the switch 170 is off, the on-off data of the five switches 94a and 94e of the second data producing unit 88 is successively transmitted from the first system 22 and successively received by the second data decomposing unit 102 of the second system 23. Accordingly, if, for example, the switch 170 is repeatedly turned on and off so that it is on in the first period and off in the second period, the on-off data of the five switches 93a to 93e of the first data producing unit 87 is transmitted and received in the first period, the on-off data of the five switches 94a to 94e of the second data producing unit 88 is transmitted and received in the second period, and this operation is repeated every two periods.

For the first transmitter-receiver system 22, the arithmetic logic unit 30 of FIG. 4 and the data selecting unit 89, data adding unit 90 and wave composing unit 91 of FIG. 14 can be assembled into a single IC. Further for the second transmitter-receiver system 23, the arithmetic logic unit 31 shown in FIG. 6 and having the same construction as the logic circuit 30 of FIG. 4 and the two data decomposing units 101, 102, switching signal holding circuit 103 and NOT circuit 103 of FIG. 15 can be assembled into a single IC.

Figure 16:
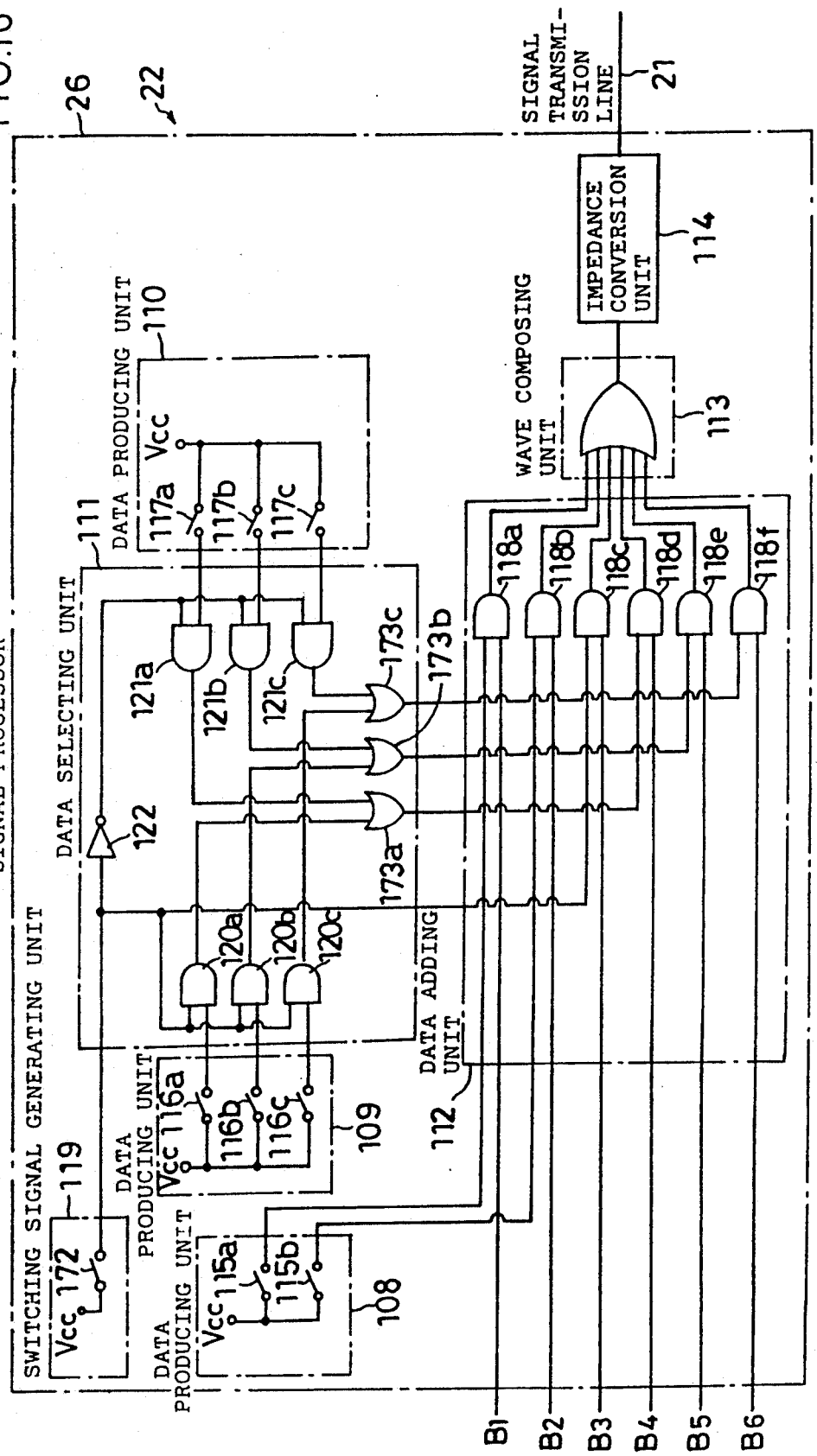
FIG. 16 is a block diagram showing an example of signal processor of the first transmitter-receiver system.
Figure 17:
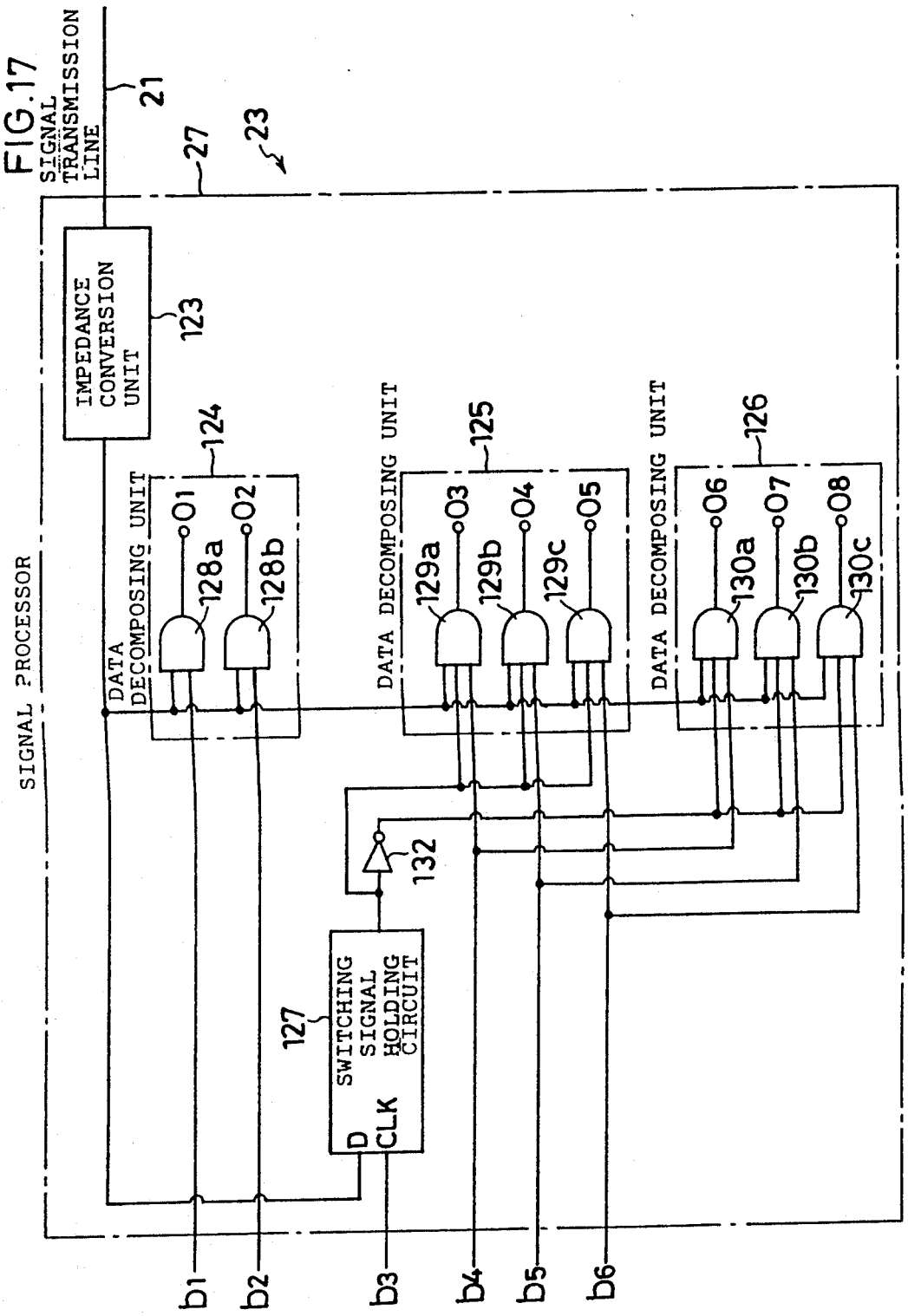
FIG. 17 is a block diagram corresponding to FIG. 16 and showing an example of signal processor of the second transmitter-receiver system.

FIGS. 16 and 17 show other examples of signal processors 26, 27, respectively, in the case where the first system 22 of FIG. 1 is used specifically for transmission and the second system 23 thereof for receiving with use of six synchronizing signals to transmit and receive a larger number of signals.

With reference to FIG. 16, the signal processor 26 of the first transmitter-receiver system 22 comprises a switching signal generating unit 119, three data producing units 108, 109, 110, data selecting unit 111, data adding unit 112, wave composing unit 113 and impedance conversion unit 114. The data adding unit 112 has six AND circuits 118a, 118b, 118c, 118d, 118e, 118f for receiving the six synchronizing signals B1 to B6, respectively. The two AND circuits 118a, 118b receive an output respectively from two switches 115a, 115b of the first data producing unit 108. The data selecting unit 111 has three AND circuits 120a, 120b, 120c for receiving an output from three switches 116a, 116b, 116c, respectively, of the second data producing unit 109 and the output of the switching signal generating unit 119. The outputs of these AND circuits 120a to 120c are fed to three OR circuits 173a, 173b, 173c. The data selecting unit 111 has three other AND circuits 121a, 121b, 121c for receiving an output from three switches 117a, 117b, 117c of the third data producing unit 110, respectively, and the output of a NOT circuit 122 connected to the switching signal generating unit 119. The outputs of these AND circuits 121a to 121c are fed to the three OR circuits 173a to 173c, respectively. The output of the signal generating unit 119 is applied to the AND circuit 118c of the data adding unit 112. The outputs of the three OR circuits 173a to 173c are fed to the remaining three AND circuits 118d, 118e, 118f of the data adding unit 112.

While the synchronizing signals B1 and B2 are on switches 115a, in succession, the on-off data of the two switches 115a, 115b of the first data producing unit 108 are successively transmitted through the two AND circuits 118a, 118b of the data adding unit 112. When the synchronizing signal B3 is on, the on-off data of a change-over switch 172 of the switching signal generating unit 119 is transmitted via the AND circuit 118c of the data adding unit 112. When the switch 172 is on if the synchronizing signal B3 is on, the output of the signal generating unit 119 is on, and the output of the NOT circuit 122 is off, so that the outputs of the three AND circuits 121a to 121c connected to the third data producing unit 110 are off. While the synchronizing signals B4, B5 and B6 are on in succession, the on-off data of the switches 116a to 116c of the second data producing unit 109 is successively transmitted via the AND circuits 120a to 120c, OR circuits 173a to 173c and AND circuits 118d, 118e, 118f. If the switch 172 is off when the signal B3 is on, the output of the switching signal generating unit 119 is off. Accordingly, the outputs of the three AND circuits 120a to 120c connected to the second data producing unit 109 are off, and the output of the NOT circuit 122 is on. While the synchronizing signals B4, B5 and B6 are on in succession, the on-off data of the switches 117a to 117c of the third data producing unit 110 are transmitted successively through the AND circuits 121a to 121c, OR circuits 173a to 173c and AND circuits 118d, 118e, 118f.

With reference to FIG. 17, the signal processor 27 of the second system 23 comprises an impedance conversion unit 123, switching signal holding circuit 127 like the above one and three data decomposing units 124, 125, 126. The output of the impedance conversion unit 123 is fed to AND circuits 128a, 128a, 129a, 129b, 129c, 130a, 130b, 130c of the three data decomposing units 124, 125, 126. The synchronizing signals b1 and b2 are fed respectively to the two AND circuits 128a, 128b of the first data decomposing unit 124, and the synchronizing signals b4, b5 and b6 respectively to the three AND circuits 129a to 129c or 130a to 130c of each of the second and third data decomposing units 125, 126. The output of the impedance conversion unit 123 is fed to a data input terminal of the holding circuit 127, and the synchronizing signal b3 to a clock input terminal of the holding circuit 127. The output of the holding circuit 127 is applied to the three AND circuits 129a to 129c of the second data decomposing unit 125. The output of the circuit 127 is also fed to the three AND circuits 130a to 130c of the third data decomposing unit 126 via a NOT circuit 132.

While the synchronizing signals b1 and b2 are on in succession, the on-off data of the two switches 115a and 115b of the first data producing unit 108 is successively transmitted from the first system 22 to the second system 23 and successively received by the first data decomposing unit 124 (outputs 01 and 02). When the synchronizing signal B3 is on, the on-off data of the changeover switch 172 in the switching signal generating unit 119 is transmitted from the first system 22 as already stated and held as the output of the holding circuit 127 during one period in which the synchronizing signals b3, b4, b5, b6, b1 and b2 are on one after another as already described. Accordingly, if the switch 172 is on when the synchronizing signal b3 is on, the output of the holding circuit 127 is held on to thereby render the output of the NOT circuit 132 off, with the result that the outputs of the three AND circuits 130a to 130c of the third decomposing unit 126 are off. While the signals b4, b5 and b6 are on in succession, the one-off data of the switches 116a to 116c of the second data producing unit 109 is successively transmitted from the first system 22 and is successively received by the second data decomposing unit 125 (outputs 03 to 05). If the change-over switch 172 is off when the synchronizing signal B3 is on, the output of the switching signal holding circuit 127 is held off to make the outputs of the three AND circuits 129a to 129c of the second data decomposing unit 125 off and render the output of the NOT circuit 132 on. While the signals b4, b5 and b6 are on in succession, the on-off data of the switches 117a to 117c of the third data producing unit 110 is successively transmitted from the first system 22 and successively received by the third data decomposing unit 126 (outputs 06 to 08).

Thus in the case of FIGS. 16 and 17, the on-off data of the two switches 115a, 115b of the first data producing unit 108 and on-off data of the three switches 116a to 116c of the second data producing unit 109 are successively transmitted from the first system 22 and successively received by the first and second data decomposing units 124, 125 of the second system 23 while the change-over switch 172 is on. While the switch 172 is off, the on-off data of the two switches 115a, 115b of the first data producing unit 108 and the three switches 117a to 117c of the third data producing unit 110 is successively transmitted from the first system to the first and third data decomposing units 124, 126 of the second system 23. Consequently, if the change-over switch is repeatedly turned on and off so that the switch 172 is on, for example, in the first period and off in the second period, the on-off data of the two switches 115a, 115b of the first data producing unit 108 and the three switches 116a to 116c of the second data producing unit 109 is transmitted and received in the first period, the on-off data of the two switches 115a, 115b of the first unit 108 and the three switches 117a to 117c of the third unit 110 is transmitted and received in the second period, and this operation is repeated every two periods.

For the first system 22, the arithmetic logic unit 30 of FIG. 4 and the data selecting unit 111, data adding unit 112 and wave composing unit 113 of FIG. 16 can be assembled into a single IC. Further for the second system, the arithmetic logic unit shown in FIG. 6 and having the same construction as the logic unit of FIG. 4, and the three data decomposing units 124, 125, 126, switching signal holding circuit 127 and NOT circuit 132 of FIG. 17 can be assembled into a single IC.

Figure 18:
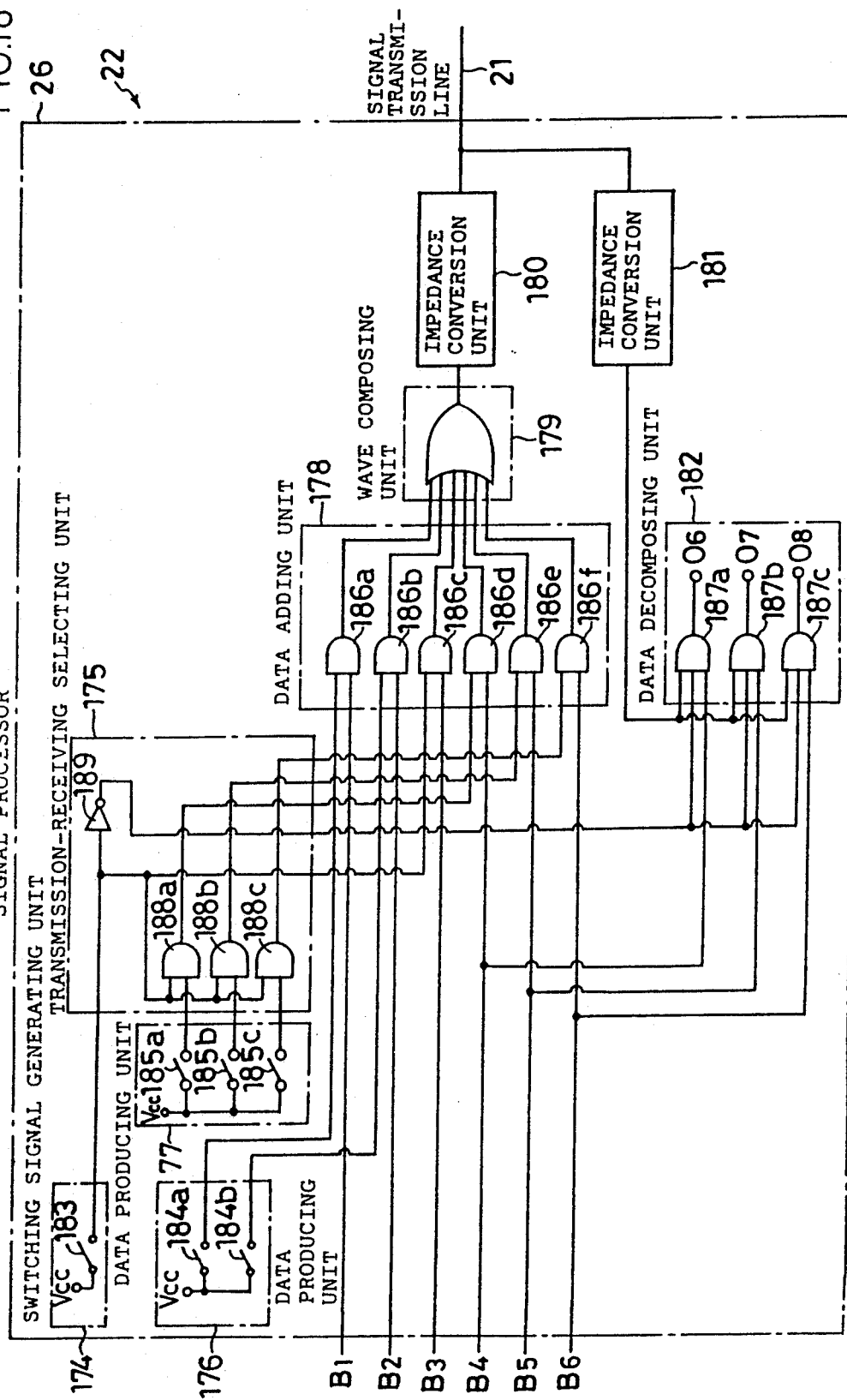
FIG. 18 is a block diagram showing an example of signal processor of the first transmitter-receiver system.
Figure 19:
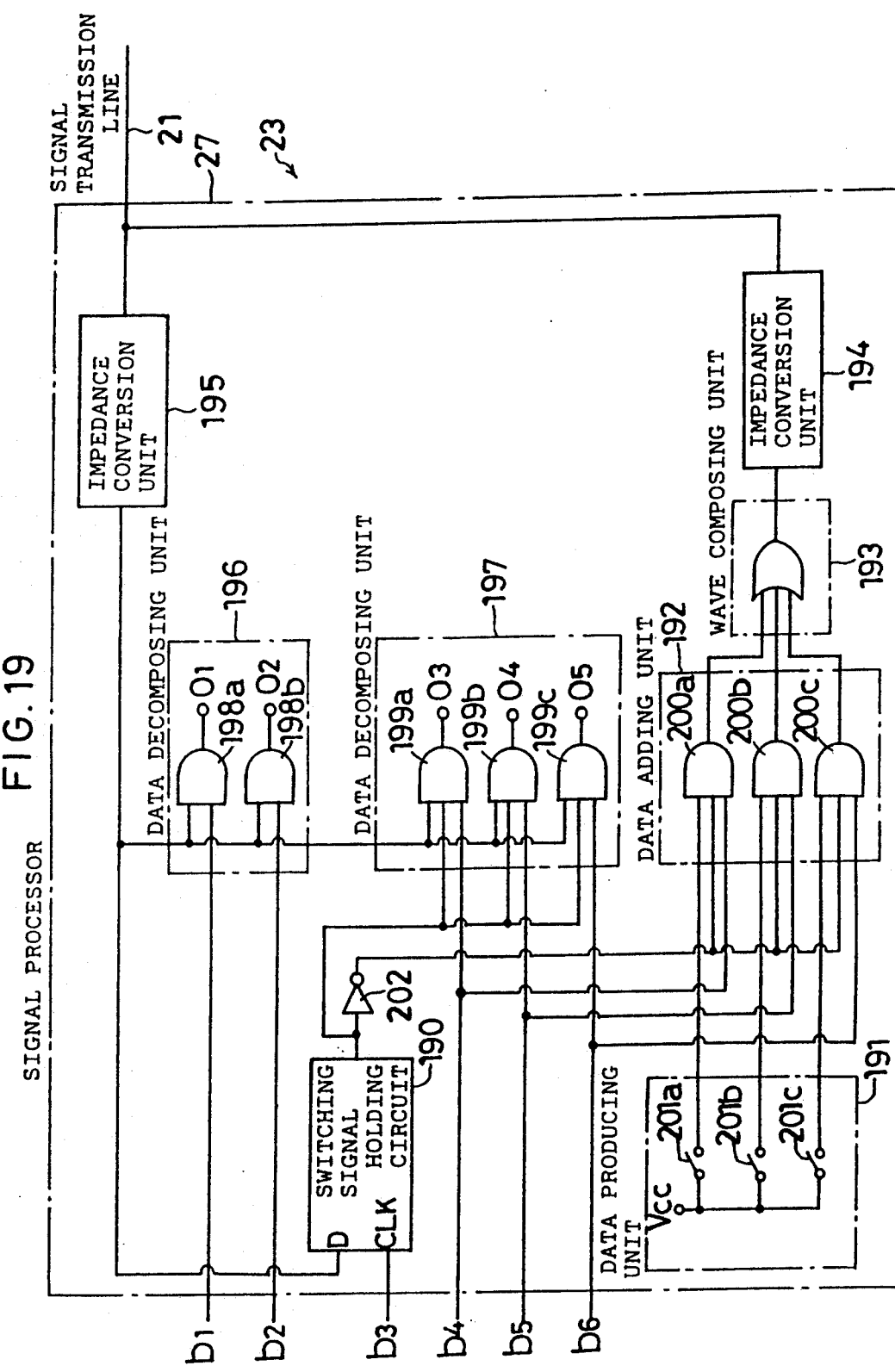
FIG. 19 is a block diagram corresponding to FIG. 18 and showing an example of signal processor of the second transmitter-receiver system.

FIGS. 18 and 19 show examples of signal processors 26, 27 of the two transmitter-receiver systems 22, 23 of FIG. 1 as made usable selectively for transmission and receiving.

With reference to FIG. 18, the signal processor of the first system 22 comprises a switching signal generating unit 174, transmission-receiving selecting unit 175, two data producing units 176, 177, data adding unit 178, wave composing unit 179, two impedance conversion units 180, 181 and data decomposing unit 182. The transmission-receiving selecting unit 175 has three AND circuits 188a, 188b, 188c and a NOT circuit 189. The data adding unit 178 has six AND circuits 186a, 186b, 186c, 186d, 186e, 186f for receiving the six synchronizing signals B1 to B6. The data decomposing unit 182 has three AND circuits 187a, 187b, 187c for receiving the three synchronizing signals B4 to B6. The outputs of two switches 184a, 184b of the first data producing unit 176 are fed to the two AND circuits 186a, 186b of the data adding unit 178, respectively. The three AND circuits 186a to 188c of the transmission-receiving selecting unit 175 receive the respective outputs of three switches 185a, 185b, 185c of the second data producing unit 177 and the output of the switching signal generating unit 174. The outputs of these AND circuits 188a to 188c are fed respectively to the three AND circuits 186d to 186f of the data adding unit 178. The output of the switching signal generating unit 174 is fed also to the AND circuit 186c of the data adding unit 178. The output of the unit 174 is further fed via the NOT circuit 189 to the three AND circuits 187a to 187c of the data decomposing unit 182. The output of the receiving impedance conversion unit 181 is fed to the three AND circuits 187a to 187c of the data decomposing unit 182.

With reference to FIG. 19, the signal processor of the second system 23 comprises a switching signal holding circuit 190 like those already mentioned, data producing unit 191, data adding unit 192, wave composing unit 193, two impedance conversion units 194, 195 and two data decomposing units 196, 197. The two data decomposing units 196 and 197 have AND circuits 198a, 198b and 199a, 199b, 199c, respectively, for receiving the output of the receiving impedance conversion unit 195.

The two synchronizing signals b1 and b2 are fed respectively to the two AND circuits 198a, 198b of the first data decomposing unit 196, and the three synchronizing signals b4, b5 and b6 respectively to the three AND circuits 199a to 199c of the second data decomposing unit 197. The three synchronizing signals b4 to b6 are also fed respectively to three AND circuits 200a, 200b, 200c of the data adding unit 192. The data producing unit 191 has three switches 201a, 201b, 201c, the outputs of which are fed respectively to the three AND circuits 200a to 200c of the data adding unit 192. The output of the switching signal holding circuit 190 is fed to the three AND circuits 199a to 199c of the second data decomposing unit 197 and also to the three AND circuits 200a to 200c of the data adding unit 192 via a NOT circuit 202.

While the synchronizing signals B1 and B2 (b1 and b2) are successively on, the on-off data of the two switches 184a, 184b of the first data producing unit 176 is successively transmitted from the first system 22 via the two AND circuits 186a, 186b of the data adding unit 178 thereof and received by the first data decomposing unit 196 of the second system 23 (outputs 01 and 02). While the synchronizing signals B4 to B6 are successively on with a change-over switch 183 of the switching signal generating unit 174 turned on, the on-off data of the three switches 185a to 185c of the second data producing unit 177 is transmitted from the first system 22 through the AND circuits 188a to 188c of the transmission-receiving selecting unit 175 and the AND circuits 186d to 186f of the data adding unit 178 thereof to the second system 23. Further when the synchronizing signal B3 becomes on with the change-over switch 183 on, the on data is transmitted from the first system 22 to the second system 23, i.e., to the data input terminal of the holding circuit 190, causing the circuit to hold its output on. Accordingly, while the synchronizing signals B4 to B6 (b4 to b6) are successively on, the on-off data of the three switches 185a to 185c of the second data producing unit 177 transmitted from the first system 22 as stated above is successively received by the second data decomposing unit 197 of the second system 23 (outputs 03, 04 and 05). When the synchronizing signal B3 becomes on with the change-over switch 183 off, the off data is transmitted from the first system 22 to the second system 23, i.e., to the data input terminal of the holding circuit 190, causing the circuit to hold its output off. Consequently, while the synchronizing signals B4 to B6 (b4 to b6) are successively on, the on-off data of the three switches 201a to 201c of the data producing unit 191 is transmitted from the second system 23 through the AND circuits 200a to 200c of the data adding unit 192 thereof to the first system 22. Further while the signals B4 to B6 (b4 to b6) are successively on with the change-over switch 183 off, the on-off data of the three switches 201a to 201c of the data producing unit 191 transmitted from the second system 23 as described above is successively received by the data decomposing unit 182 of the first system 22 (outputs 06, 07 and 08). Thus, while the synchronizing signals B1 to B6 are successively on with the change-over switch 183 on, the on-off data of the two switches 184a, 184b of the first data producing unit 176 and the three switches 185a to 185c of the second data producing unit 177 is successively transmitted from the first system 22 to the first and second data decomposing units 196, 197 of the second system. While the signals B1 and B2 (b1 and b2) are successively on with the change-over switch 183 off, the on-off data of the two switches 184a, 184b of the first data producing unit 176 is successively transmitted from the first system 22 to the first data decomposing unit 196 of the second system 23. While the signals B4 to B6 (b4 to b6) are successively on with the switch 183 off, the on-off data of the three switches 201a to 201c of the data producing unit 191 is transmitted from the second system 23 to the data decomposing unit 182 of the first system 22.

Figure 20:
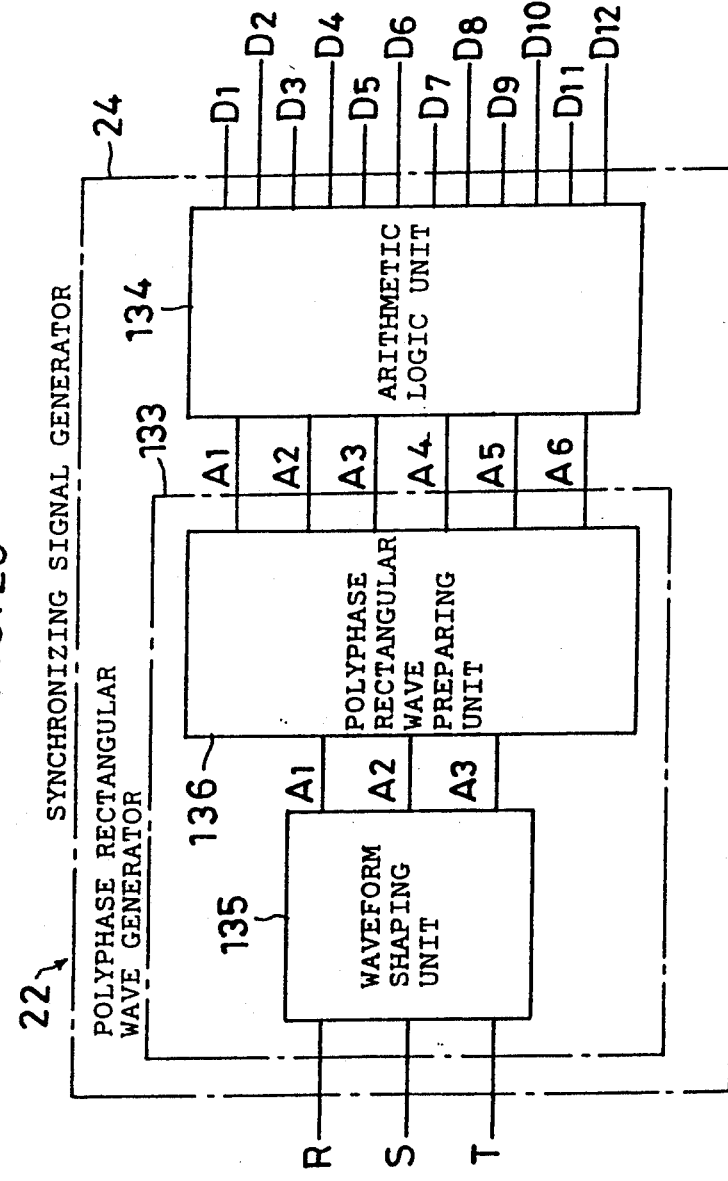
FIG. 20 is a block diagram showing an example of synchronizing signal generator of the first transmitter-receiver system.

FIG. 20 shows another example of synchronizing signal generator 24 of the first transmitter-receiver system 22 of FIG. 1.

The synchronizing signal generator 24 produces twelve synchronizing signals D1, D2, D3, D4, D5, D6, D7, D8, D9, D10, D11 and D12 from a three-phase alternating current and comprises a polyphase rectangular wave generator 133 and an arithmetic logic unit 134. The wave generator 133 shapes the waveform of the three-phase current to produce six-phase rectangular waves A1, A2, A3, A4, A5 and A6. The arithmetic logic unit 134 produces the twelve synchronizing signals D1 to D12 from combinations of the six-phase rectangular waves A1 to A6 by logic elements. The polyphase rectangular wave generator 133 comprises a waveform shaping unit 135 like the one already mentioned, and a polyphase rectangular wave preparing unit 136 serving as means for preparing polyphase rectangular waves. The wave preparing unit 136 prepares the six-phase rectangular waves A1 to A6 from three-phase rectangular waves A1–A3.

Figure 21:
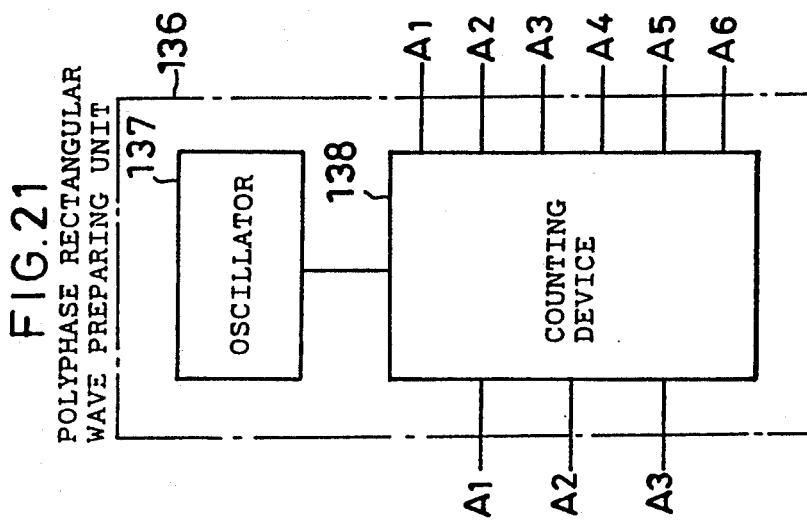
FIG. 21 is a block diagram showing an example of a unit for preparing polyphase rectangular waves.

FIG. 21 shows an example of polyphase rectangular wave preparing unit 136.

The polyphase rectangular wave preparing unit 136 comprises an oscillator 137 for producing pulses of a predetermined period, and a counting device 138 serving as counting means for counting up pulses from the oscillator 137 to thereby prepare polyphase rectangular waves from the three-phase rectangular waves A1 to A3.

The counting device 138 determines the difference in phase between the three-phase rectangular waves A1 to A3 using pulse counters C1, C2 and C2, calculates a new phase difference by multiplying the phase difference by a predetermined ratio K and prepares new rectangular waves different from the original rectangular waves in phase.

The ratio K is represented by the following equation:

$$K = (2 \times m - 1)/2^n$$

where $n = 2, 3, \ldots \infty$, and $m = 1$ to $2^{n-2}$.

When $n=2$, $K=\frac{1}{4}$. Using this K value, three new rectangular waves A4 to A6 are prepared which are different from A1–A3 in phase by $\frac{1}{4}$ (30 degrees) of the phase difference (120 degrees) between the waves A1 to A3. Thus six-phase rectangular waves A1 to A6 are obtained.

When $n=3$, $K=\frac{1}{8}, \frac{3}{8}$. Using these two K values and K ($=\frac{1}{4}$) for $n=2$, nine new rectangular waves A4–A12 are prepared which are different from A–A3 in phase by $\frac{1}{8}$ (15 degrees), $\frac{1}{4}$ (30 degrees) or $\frac{3}{8}$ (45 degrees) of the phase difference (120 degrees) between the waves A1 to A3. Thus twelve-phase rectangular waves A1 to A12 are obtained.

When $n=4$, $K=1/16, 3/16, 5/16, 7/16$. Similarly, 24-phase rectangular waves are obtained.

Through the same procedure as above when n is not smaller than 5, rectangular waves of $3\times 2^{n-1}$ phases are obtained.

Next with reference to FIG. 22 the operation of the counting device 138 for preparing six-phase rectangular waves A1 to A6 and 12-phase rectangular waves A1 to A12 will be described.

When six-phase rectangular waves are to be prepared, the counter C1 starts addition at the leading edge of the wave A1 and discontinues the addition at the leading edge of the wave A2. Thus, the phase difference of 120 degrees between the waves A1 and A2 is set on the counter C1. Counters C5a and C5b are therefore set to ¼ (K) of the difference, i.e., C1/4, and the counter C5a starts subtraction. When C5a becomes zero, A5 is caused to rise. At the trailing edge of the wave A2, C5b starts subtraction, and when C5b becomes zero, the wave A5 is caused to decay. Thus, the wave A5 is obtained which is delayed from the wave A2 by C1/4 (=30 degrees) in phase. On the other hand, the counter C2 starts addition at the leading edge of the wave A2 and discontinues the addition at the leading edge of the wave A3, whereby the counter C2 is set to the phase difference of 120 degrees between the waves A2 and A3. Counters C6a and C6b are therefore set to ¼ (K) of the difference, i.e., C2/4, and C6a starts subtraction. Upon C6b becoming zero, a wave A6 is caused to rise. At the trailing edge of the wave A3, C6b starts subtraction, and when C6b becomes zero, the wave A6 is caused to decay. Thus, the wave A6 is obtained which is delayed from the wave A3 by C2/4 (=30 degrees) in phase. On the other hand, the counter C3 starts addition at the leading edge of the wave A3 and discontinues the addition at the leading edge of the wave A1, whereby the counter C3 is set to the phase difference of 120 degrees between the waves A3 and A1. Counters C4a and C4b are therefore set to ¼ (K) of the difference, i.e., C3/4, and C4a starts subtraction. Upon the C4a count decreasing to zero, a wave A4 is caused to rise. At the trailing edge of the wave A1, C4b starts subtraction, and when the C4b count reduces to zero, the wave A4 is caused to decay. Thus, the wave A4 is obtained which is delayed from the wave A1 by C3/4 (=30 degrees) in phase.

When 12-phase rectangular waves are to be prepared, at the leading edge of the wave A2, counters C5a and C5b are set to C1/4, counters C8a, C8b to C1/8, and counters C11a, C11b to 3C1/8. In the same manner as above, a wave A5 is formed using C5a and C5b, a wave A8 with use of C8a and C8b, and a wave A11 with C11a and C11b. Further at the leading edge of the wave A3, counters C6a, C6b are set to C2/4, counters C9a, C9b to C2/8, and counters C12a, C12b to 3C2/8. In the same manner as above, a wave A6 is formed with use of C6a and C6b, a wave A9 with C9a and C9b, and a wave A12 with C12a and C12b. Further at the leading edge of the wave A1, counters C4a, C4b are set to C3/4, counters C7a, C7b to C3/8, and counters C10a, C10b to 3C3/8. In the same manner as above, a wave A4 is formed with use of C4a and C4b, a wave A7 with C7a and C7b, and a wave A10 with C10a and C10b.

In the case of FIG. 20 as in the case of FIG. 4, the arithmetic logic unit 134 is adapted to produce the twelve synchronizing signals D1 to D12 by twelve AND circuits in accordance with the following truth table.

|  | A1 | A2 | A3 | A4 | A5 | A6 |
|---|---|---|---|---|---|---|
| B1 | 1 | 0 | 1 | 0 | 0 | 1 |
| B2 | 1 | 0 | 1 | 1 | 0 | 1 |
| B3 | 1 | 0 | 0 | 1 | 0 | 1 |
| B4 | 1 | 0 | 0 | 1 | 0 | 0 |
| B5 | 1 | 1 | 0 | 1 | 0 | 0 |
| B6 | 1 | 1 | 0 | 1 | 1 | 0 |
| B7 | 0 | 1 | 0 | 1 | 1 | 0 |
| B8 | 0 | 1 | 0 | 0 | 1 | 0 |
| B9 | 0 | 1 | 1 | 0 | 1 | 0 |
| B10 | 0 | 1 | 1 | 0 | 1 | 1 |
| B11 | 0 | 0 | 1 | 0 | 1 | 1 |
| B12 | 0 | 0 | 1 | 0 | 0 | 1 |

Figure 23:
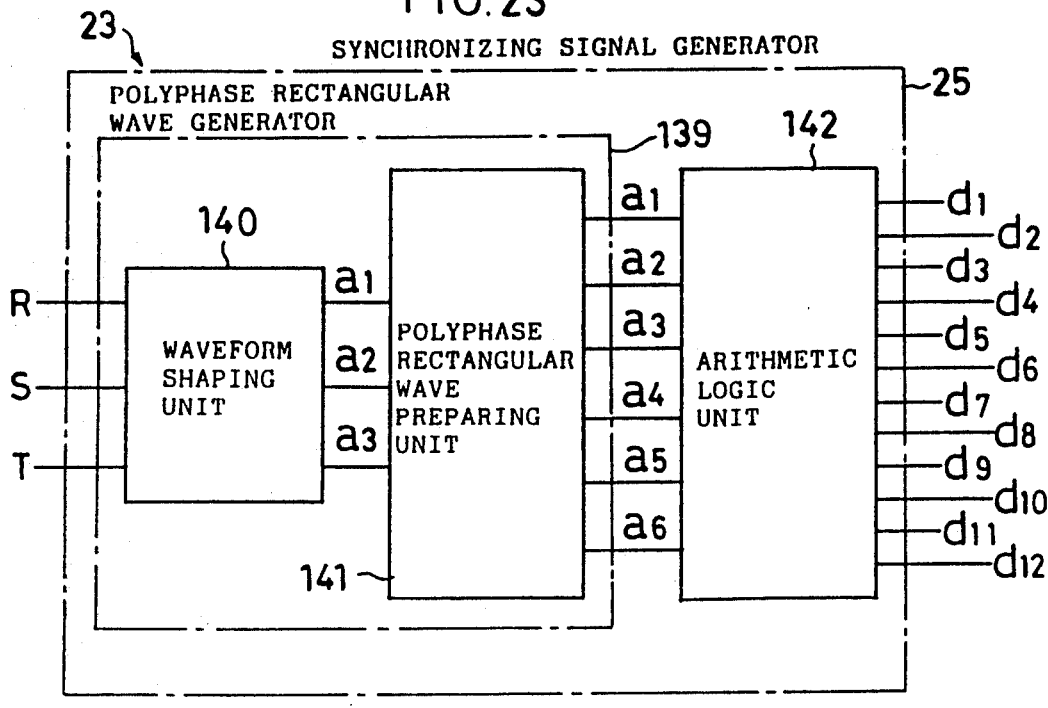
FIG. 23 is a block diagram corresponding to FIG. 20 and showing an example of synchronizing signal generator of the second transmitter-receiver system.

FIG. 23 shows another example of synchronizing signal generator 25 of the second transmitter-receiver system 23.

The illustrated generator 25 is the same as the synchronizing signal generator 24 of the first system 22 of FIG. 20. A polyphase rectangular wave generator 139 has a waveform shaping unit 140 for shaping the waveform of the R, S and T waves of a three-phase alternating current to produce three-phase rectangular waves a1 to a3, and a polyphase rectangular wave preparing unit 141 for producing six-phase rectangular waves a1, a2, a3, a4, a5 and a6 which are the same as the waves A1 to A6. An arithmetic logic unit 142 produces twelve synchronizing signals d1, d2, d3, d4, d5, d6, d7, d8, d9, d10, d11 and d12 which are the same as the waves D1 to D12.

For the first system 22, the counting devices 138 of FIG. 21 can be provided in the form of a single IC including the arithmetic logic unit 134 of FIG. 20, etc. The same is true of the second system 23.

Figure 24:
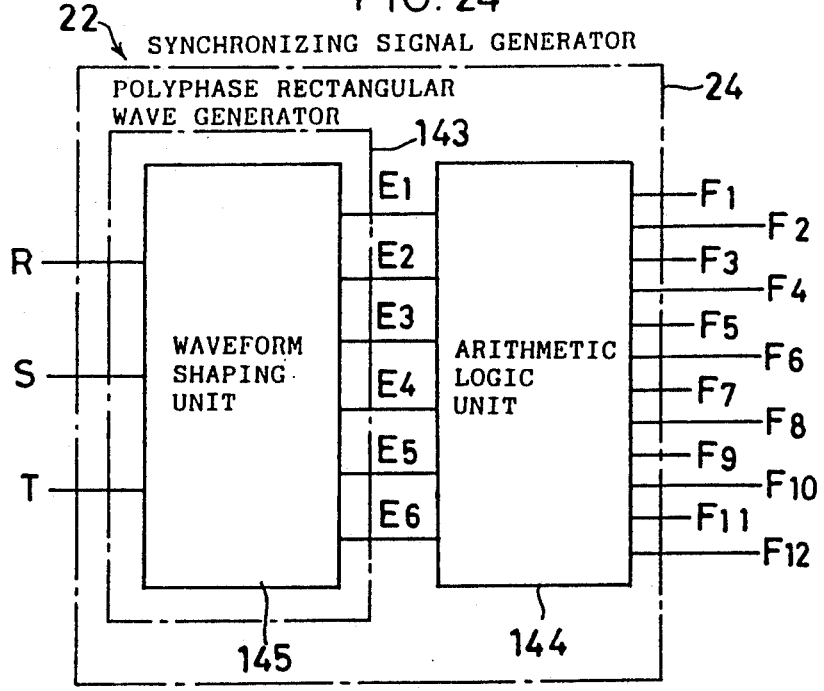
FIG. 24 is a block diagram showing an example of synchronizing signal generator of the first transmitter-receiver system.

FIG. 24 shows another example of synchronizing signal generator 24 of the first transmitter-receiver system 22 of FIG. 1.

The illustrated generator 24 also produces twelve synchronizing signals F1, F2, F3, F4, F5, F6, F7, F8, F9, F10, F11 and F12 from a three-phase alternating current, and comprises a polyphase rectangular wave generator 143 and an arithmetic logic unit 144. The generator 143 comprises a waveform shaping unit 145 for shaping the waveform of a three-phase alternating current to produce six-phase rectangular waves E1, E2, E3, E4, E5 and E6. The arithmetic logic unit 14, like those already mentioned, produces twelve synchronizing signals F1 to F12 by logic elements from combinations of the six-phase rectangular waves.

Figure 25:
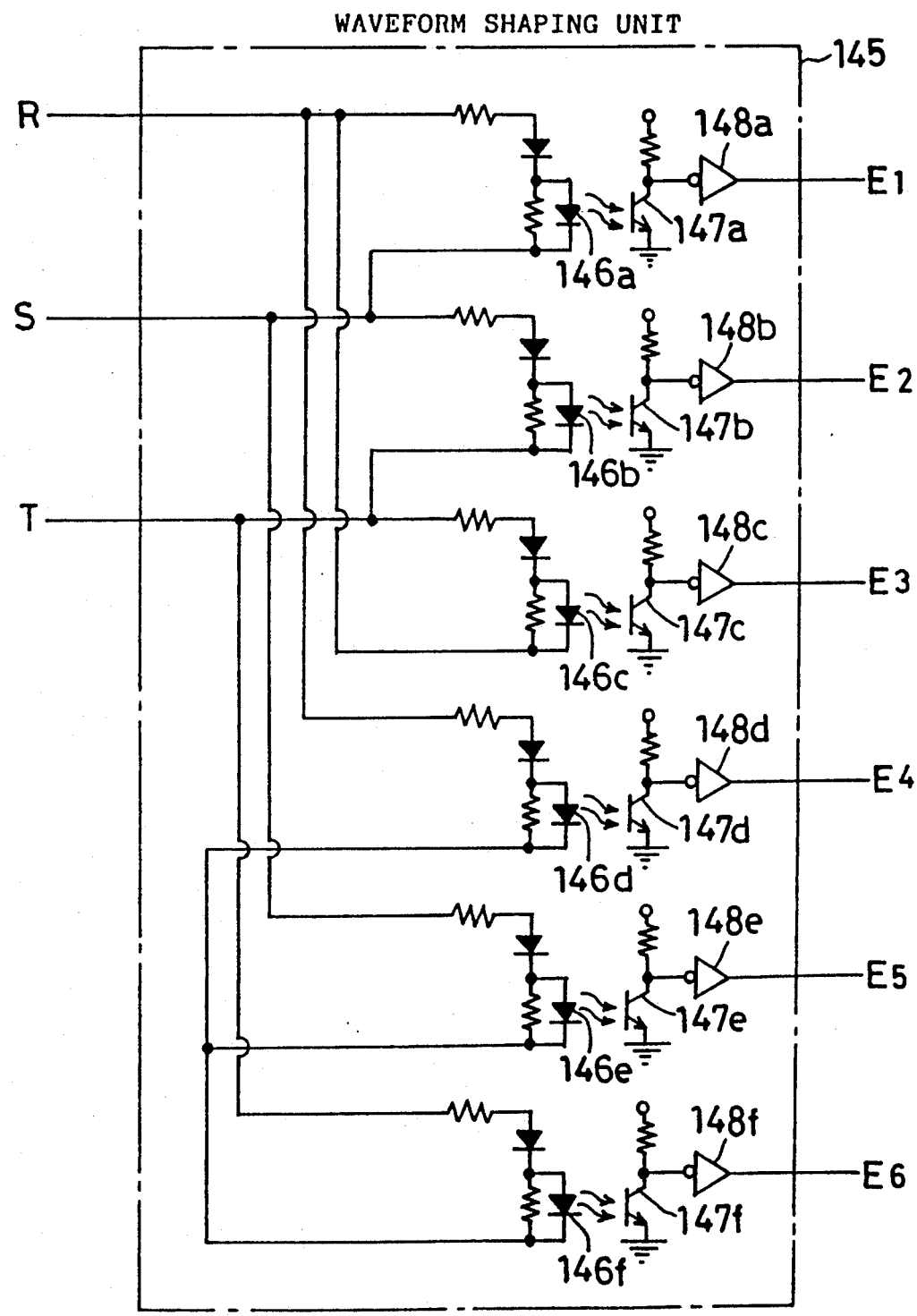
FIG. 25 is a block diagram showing an example of waveform shaping unit.

FIG. 25 shows an example of waveform shaping unit 145.

The R, S and T phases of a three-phase alternating current supply are connected to light-emitting diodes 146a, 146b, 146c, 146d, 146e, 146f by delta-connection and wye-connection. Six phototransistors 147a, 147b, 147c, 147d, 147f are provided for the light-emitting dioes 146a to 146f, respectively for forming photocouplers therewith, and have connected thereto Schmitt trigger circuits 148a, 148b, 148c, 148d, 148e, 148f, respectively. The Schmitt trigger circuits 148a to 148f deliver six-phase rectangular waves E1 to E6 which are different from one another in phase.

Figure 26:
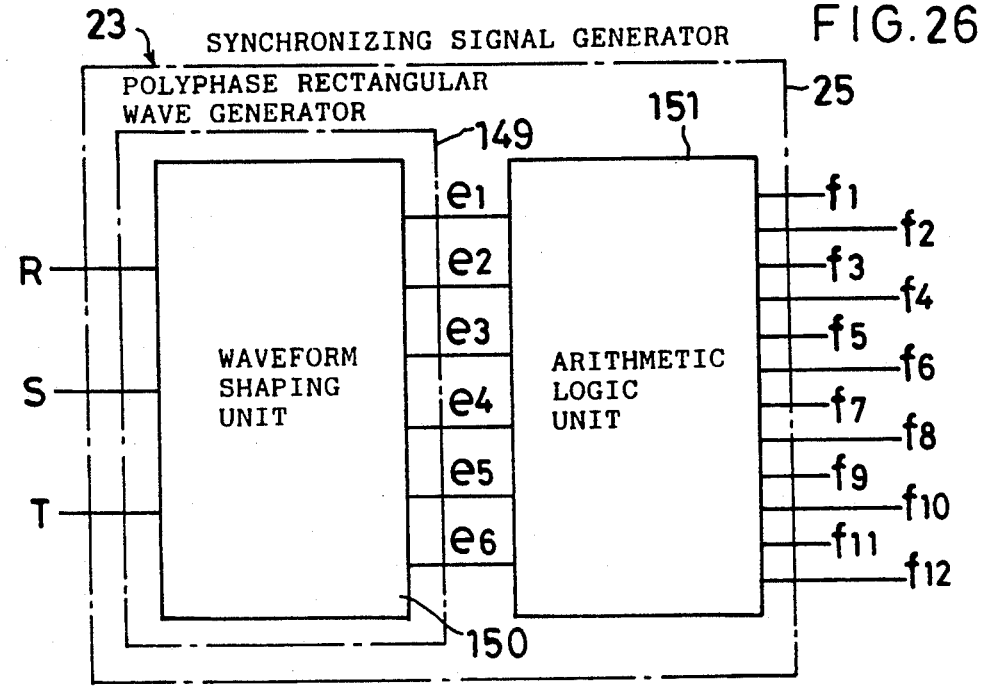
FIG. 26 is a block diagram corresponding to FIG. 24 and showing an example of synchronizing signal generator of the second transmitter-receiver system.
Figure 27:
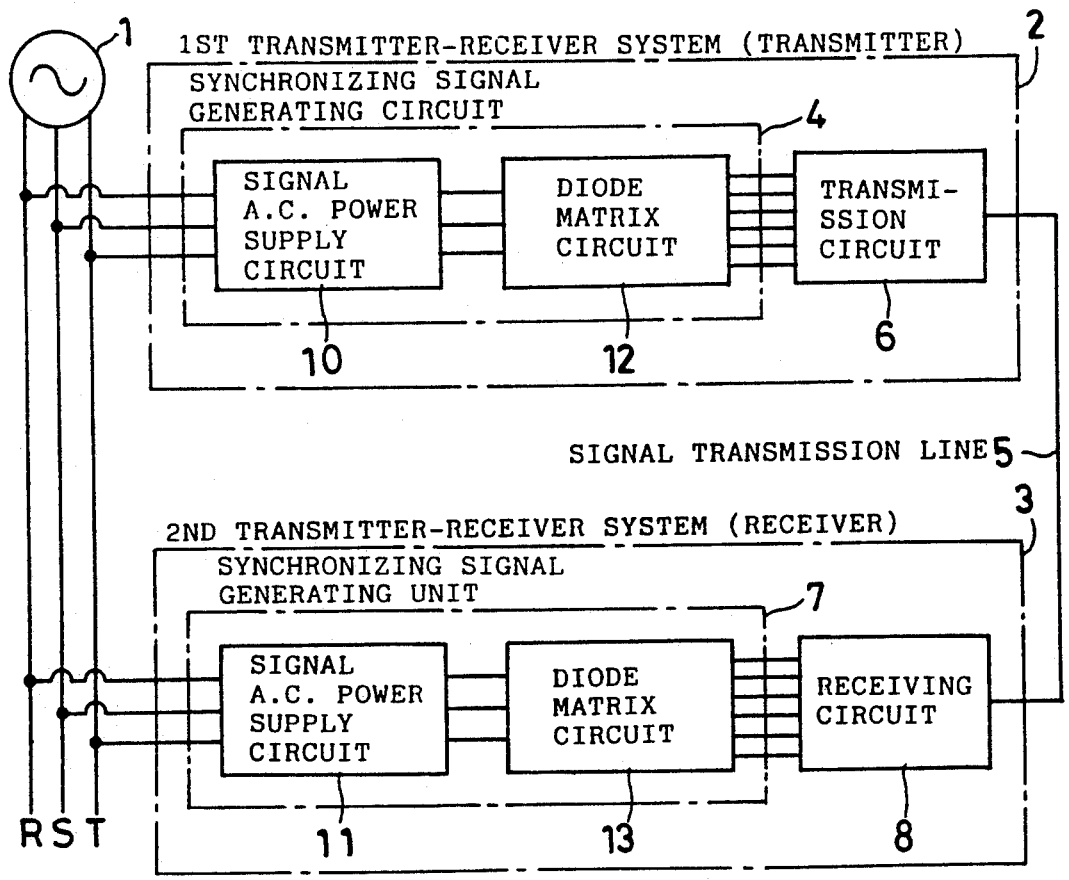
FIG. 27 is a block diagram showing two transmitter-receiver systems of the prior art.

FIG. 26 shows still another example of synchronizing signal generator 25 of the second transmitter-receiver system 23.

The illustrated generator 25 is the same as the synchronizing signal generator 24 of the first transmitter-receiver system of FIG. 24. A polyphase rectangular wave generator 149 has a waveform shaping unit 150 for shaping the waveform of a three-phase alternating current to produce six-phase rectangular waves e1, e2, e3, e4, e5 and e6 which are the same as the waves E1 to E6. An arithmetic logic unit 51 produces twelve synchronizing signals f1, f2, f3, f4, f5, f6, f7, f8, f9, f10, f11 and f12, which are the same as the signals F1 to F12, by logic elements based on combinations of the six-phase rectangular waves.

I claim:

1. In a multiplex transmitter-receiver system having a synchronizing signal generating means for producing a plurality of multiplex transmission-receiving synchronizing signals from a three-phase alternating current, and signal processing means for effecting signal processing based on the synchronizing signals for transmitting and/or receiving a plurality of signals through a single signal transmission line, the improvement comprising:

a synchronizing signal generating means including a transformerless polyphase rectangular wave generating means for producing polyphase rectangular waves by shaping the waveform of the three-phase alternating current, and arithmetic logic means for producing a plurality of multiplex transmission-receiving synchronizing signals by logic elements based on combinations of the polyphase rectangular waves.

2. An improved multiplex transmitter-receiver system as recited in claim 1 wherein the polyphase rectangular wave generating means comprises a waveform shaping means for producing three-phase rectangular waves by shaping the waveform of the three-phase alternating current.

3. An improved multiplex transmitter-receiver system as recited in claim 1 wherein the polyphase rectangular wave generating means comprises waveform shaping means for producing three-phase rectangular waves by shaping the waveform of the three-phase alternating current, and means for preparing polyphase rectangular waves at least six in the number of phases from the three-phase rectangular waves.

4. An improved multiplex transmitter-receiver system as recited in claim 2 or claim 3, wherein the waveform shaping means comprises three light-emitting diodes connected to a three-phase alternating current supply, and three phototransistors provided for the light-emitting diodes, respectively.

5. An improved multiplex transmitter-receiver system as recited in claim 3 wherein the polyphase rectangular wave preparing means comprises an oscillator for producing pulses of a predetermined period, and counting means having pulse counters for counting up pulses from the oscillator, and the counting means prepares new rectangular waves different from the original rectangular waves in phase by determining the difference in phase between the three-phase rectangular waves using the pulse counters and calculating a new phase difference from the difference in phase.

6. An improved multiplex transmitter-receiver system as recited in claim 1 wherein the polyphase rectangular wave generating means comprises waveform shaping means for producing six-phase rectangular waves by shaping the waveform of the three-phase alternating current.

7. An improved multiplex transmitter-receiver system as recited in claim 6 wherein the waveform shaping means comprises six light-emitting diodes delta- and wye-connected to a three-phase alternating current supply, and six phototransistors provided for the light-emitting diodes, respectively.

* * * * *